US010309606B2

(12) United States Patent
Takada et al.

(10) Patent No.: US 10,309,606 B2
(45) Date of Patent: Jun. 4, 2019

(54) VEHICLE LAMP

(71) Applicant: KOITO MANUFACTURING CO., LTD., Tokyo (JP)

(72) Inventors: Kenichi Takada, Shizuoka (JP); Tatsuma Kitazawa, Shizuoka (JP); Teruaki Yamamoto, Shizuoka (JP); Hiroki Kawai, Shizuoka (JP); Akira Hanada, Shizuoka (JP)

(73) Assignee: KOITO MANUFACTURING CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/606,900

(22) Filed: May 26, 2017

(65) Prior Publication Data

US 2017/0343173 A1 Nov. 30, 2017

(30) Foreign Application Priority Data

May 27, 2016 (JP) ................................ 2016-106380
May 27, 2016 (JP) ................................ 2016-106381
(Continued)

(51) Int. Cl.
*B60Q 1/00* (2006.01)
*F21S 41/33* (2018.01)
(Continued)

(52) U.S. Cl.
CPC ............ *F21S 41/338* (2018.01); *F21S 41/00* (2018.01); *F21S 41/143* (2018.01);
(Continued)

(58) Field of Classification Search
CPC .......... F21S 41/00; F21S 41/14; F21S 41/141; F21S 41/143; F21S 41/147; F21S 41/148;
(Continued)

(56) References Cited

U.S. PATENT DOCUMENTS

| | | | | |
|---|---|---|---|---|
| 6,976,775 B2 * | 12/2005 | Koike | F21K 9/00 362/545 |
| 7,722,236 B2 * | 5/2010 | Naganawa | B60Q 1/085 362/543 |

(Continued)

FOREIGN PATENT DOCUMENTS

| | | |
|---|---|---|
| JP | 2011-175818 A | 9/2011 |
| JP | 2016-039020 A | 3/2016 |

*Primary Examiner* — Ali Alavi
(74) *Attorney, Agent, or Firm* — Sughrue Mion, PLLC

(57) ABSTRACT

There is provided a vehicle lamp including a projection lens, a first light source arranged at a rear of the projection lens and configured to emit light for forming a predetermined light distribution pattern, a reflector configured to reflect the light emitted from the first light source towards the projection lens, a first array light source arranged at the rear of the projection lens and including a plurality of semiconductor light emitting elements aligned in at least one row, and a second array light source arranged at the rear of the projection lens and including a plurality of semiconductor light emitting elements aligned in at least one row. The first array light source and the second array light source are arranged in an upper-lower direction.

35 Claims, 23 Drawing Sheets

(30) Foreign Application Priority Data

May 27, 2016 (JP) ................................. 2016-106382
May 27, 2016 (JP) ................................. 2016-106383

(51) Int. Cl.

| | |
|---|---|
| ***F21S 41/00*** | (2018.01) |
| ***F21S 41/19*** | (2018.01) |
| ***F21S 41/143*** | (2018.01) |
| ***F21S 41/147*** | (2018.01) |
| ***F21S 41/255*** | (2018.01) |
| ***F21S 41/265*** | (2018.01) |
| ***F21S 41/32*** | (2018.01) |
| ***F21S 41/43*** | (2018.01) |
| ***F21S 41/663*** | (2018.01) |
| ***F21S 45/47*** | (2018.01) |
| ***F21S 45/435*** | (2018.01) |
| ***F21S 41/153*** | (2018.01) |
| ***F21S 41/148*** | (2018.01) |
| *F21S 41/25* | (2018.01) |
| *F21S 41/20* | (2018.01) |
| *F21S 41/14* | (2018.01) |
| *F21S 43/00* | (2018.01) |
| *F21S 41/30* | (2018.01) |
| *F21S 41/141* | (2018.01) |
| *F21S 41/10* | (2018.01) |
| *F21W 102/145* | (2018.01) |
| *F21W 102/13* | (2018.01) |

(52) U.S. Cl.

CPC ........... *F21S 41/147* (2018.01); *F21S 41/148* (2018.01); *F21S 41/153* (2018.01); *F21S 41/192* (2018.01); *F21S 41/255* (2018.01); *F21S 41/265* (2018.01); *F21S 41/321* (2018.01); *F21S 41/43* (2018.01); *F21S 41/663* (2018.01); *F21S 45/435* (2018.01); *F21S 45/47* (2018.01); *F21S 41/10* (2018.01); *F21S 41/14* (2018.01); *F21S 41/141* (2018.01); *F21S 41/20* (2018.01); *F21S 41/25* (2018.01); *F21S 41/285* (2018.01); *F21S 41/30* (2018.01); *F21S 43/00* (2018.01); *F21W 2102/13* (2018.01); *F21W 2102/145* (2018.01)

(58) Field of Classification Search

CPC .......... F21S 41/153; F21S 41/20; F21S 41/25; F21S 41/255; F21S 41/30; F21S 41/321; F21S 41/338; F21S 41/663; F21W 2102/13; F21W 2102/17; F21W 2102/20

See application file for complete search history.

(56) References Cited

U.S. PATENT DOCUMENTS 8,123,377 B2 * 2/2012 Lundberg ............... B64D 47/06 362/243
8,132,947 B2 * 3/2012 Shih ..................... B60Q 1/0041 362/547
8,475,021 B2 * 7/2013 Iwasaki ................. F21S 41/147 362/519
2008/0055896 A1 * 3/2008 Feldmeier .......... H05B 33/0872 362/231
2011/0205748 A1 8/2011 Yatsuda
2017/0067609 A1 * 3/2017 Ichikawa ............. F21S 48/1145

* cited by examiner

VEHICLE LAMP

CROSS-REFERENCE TO RELATED APPLICATIONS

The present application claims the benefit of priority of Japanese Patent Application Nos. 2016-106380, 2016-106381, 2016-106382 and 2016-106383, all filed on May 27, 2016, the content of which is incorporated herein by reference.

TECHNICAL FIELD

Aspects of the present invention relates to a vehicle lamp.

BACKGROUND

In recent years, there has been developed a vehicle lamp including an array light source having a plurality of semiconductor light emitting elements such as Light Emitting Diodes (LEDs) arranged in a row shape.

JP-A-2016-039020 discloses a vehicle lamp including an array light source in a projector-type optical system using a single projection lens.

However, according to the vehicle lamp disclosed in JP-A-2016-039020, the number of the semiconductor light emitting elements that can be mounted to the array light source is limited due to a space of the lamp. For this reason, in some cases, a desired light distribution pattern may not be added to a predetermined light distribution pattern such as a light distribution pattern for low beam by using the array light source.

Also, there has been developed a vehicle lamp using a multifocal projection lens.

For example, JP-A-2011-175818 suggests a vehicle lamp having a multifocal projection lens, a light source for low beam light distribution and a light source for high beam light distribution. According to this vehicle lamp, it is possible to design a variety of light distribution patterns by the respective light sources.

However, according to the lamp disclosed in JP-A-2011-175818, since the projection lens is divided in an upper-lower direction, there is room for improving an outward design when seeing the lamp from the front.

Also, according to the lamp disclosed in JP-A-2016-039020, an additional light distribution pattern for high beam and a light distribution pattern for low beam do not partially overlap with each other in the vicinity of a boundary of the respective light distribution patterns, so that a road surface is not sufficiently illuminated.

Further, according to the lamp disclosed in JP-A-2016-039020, the number of the semiconductor light emitting elements that can be mounted to the array light source is limited due to the space of the lamp. For this reason, in some cases, a light distribution pattern may not be formed using the array light source, depending on utilities or situations.

SUMMARY

Accordingly, a first aspect of the present invention provides a vehicle lamp capable of improving a degree of design freedom of a light distribution pattern that is to be added to a predetermined light distribution pattern, while suppressing the lamp from increasing in size.

A second aspect of the present invention provides a vehicle lamp capable of improving a degree of design freedom of a light distribution pattern while keeping an aesthetic quality of the lamp.

A third aspect of the present invention provides a vehicle lamp capable of enhancing a road surface illumination function.

A fourth aspect of the present invention provides a vehicle lamp capable of forming a variety of light distribution patterns while suppressing the lamp from increasing in size.

According to an illustrative embodiment, there is provided a vehicle lamp including:

a projection lens; a first light source arranged at a rear of the projection lens and configured to emit light for forming a predetermined light distribution pattern;

a reflector configured to reflect the light emitted from the first light source towards the projection lens;

a first array light source arranged at the rear of the projection lens and including a plurality of semiconductor light emitting elements aligned in at least one row; and a second array light source arranged at the rear of the projection lens and including a plurality of semiconductor light emitting elements aligned in at least one row, wherein the first array light source and the second array light source are arranged in an upper-lower direction.

According to the above configuration, the vehicle lamp includes the first array light source and the second array light source, and the first array light source and the second array light source are arranged in the upper-lower direction. For this reason, it may be possible to mount more semiconductor light emitting elements to the lamp without increasing a width of the lamp in a left-right direction. Also, since it is possible to mount more semiconductor light emitting elements, as compared to a lamp having one array light source, it may be possible to improve a degree of design freedom of a light distribution pattern that is to be added to a predetermined light distribution pattern, which is to be formed by the light of the first light source.

In the above vehicle lamp, the projection lens may have a first back focal point and a second back focal point, the first array light source may be arranged at a position corresponding to the first back focal point, and the second array light source may be arranged at a position corresponding to the second back focal point.

According to the above configuration, it may be possible to illuminate the lights ahead of the lamp, which are to be emitted from the first array light source and the second array light source, as clear light distribution patterns while suppressing the lamp from increasing in size. Also, it may be possible to use the light to be emitted from the first array light source, as light for enhancing the road surface illumination function, for example.

In the above vehicle lamp, the plurality of semiconductor light emitting elements of the first array light source may be configured to be individually lit on and off, the plurality of semiconductor light emitting elements of the second array light source may be configured to be individually lit on and off, and in light distribution patterns to be projected on a vertical virtual screen ahead of the lamp, a light distribution pattern which is to be formed by the respective semiconductor light emitting elements of the first array light source and a light distribution pattern which is to be formed by the respective semiconductor light emitting elements of the second array light source may be offset in a left-right direction of the lamp.

According to the above configuration, it may be possible to increase the number of divisions in the light distribution patterns, which are configured by the first array light source and the second array light source, and to improve the resolutions thereof, so that it is possible to form a variety of light distribution patterns, depending on utilities or situations.

In the above vehicle lamp, the second array light source may be configured to emit light for forming at least a part of a light distribution pattern for high beam.

According to the above configuration, it may be possible to effectively utilize the light to be emitted from the second array light source, as at least a part of a light distribution pattern for high beam.

In the above vehicle lamp, the first array light source may be arranged between the first back focal point of the projection lens and the first light source in a front-rear direction of the lamp.

According to the above configuration, it may be possible to illuminate the light emitted from the first array light source ahead of the lamp through the vicinity of the first back focal point while suppressing the lamp from increasing in size in the front-rear direction.

In the above vehicle lamp, the first light source may be configured to emit light for forming a light distribution pattern for low beam, and the vehicle lamp may further include:

a base member, on which the first light source, the first array light source and the second array light source are mounted; and an optical member which is a component separate from the base member and is configured to function as a shade for forming a cutoff line of the light distribution pattern for low beam at a state where the optical member is mounted to the base member.

When a part configured to function as a shade is formed at a tip end of the base member, the tip end has a predetermined thickness due to restraints of processing conditions of the base member. Since the tip end cannot reflect forward the light, it becomes a cause of a dark part.

According to the above configuration, since the optical member is a component separate from the base member, it may be possible to thinly form the tip end without being restrained to the processing conditions of the base member. For this reason, it may be possible to reduce the thickness of the tip end becoming a cause of a dark part, so that it is possible to suppress the dark part to such a level that a driver cannot notice the same.

In the above vehicle lamp, the optical member may include:

a first reflective surface configured to reflect the light emitted from the first array light source towards an incident surface of the projection lens; and a second reflective surface configured to reflect the light emitted from the second array light source towards the incident surface of the projection lens.

According to the above configuration, it is possible to further effectively use the lights to be emitted from the first array light source and the second array light source.

In the above vehicle lamp, the base member may include a first surface on which the first light source is arranged and a second surface on which the first array light source and the second array light source are arranged, and the second surface may be an inclined surface which is inclined relative to an optical axis of the projection lens such that a light output part of the first array light source arranged on the second surface faces obliquely in a front and upper direction and a light output part of the first array light source is located below the first back focal point.

According to the above configuration, it may be possible to enable most of the light to be emitted from the first array light source to pass by the first back focal point while arranging the first array light source at a position avoiding a light path for forming a light distribution pattern for low beam. For this reason, it may be possible to effectively use the light of the first array light source.

The above vehicle lamp may further include:

a rigid circuit board, on which the first array light source and the second array light source are arranged, and at least a part of the rigid circuit board may be fixed to the inclined surface.

According to the above configuration, it may be possible to easily arrange the first array light source and the second array light source at predetermined positions of the base member.

The vehicle lamp may further include:

a flexible circuit board, on which the first array light source and the second array light source are arranged, and at least a part of the flexible circuit board may be fixed to the inclined surface.

According to the above configuration, the operability may be improved upon the mounting of the first array light source and the second array light source to the base member.

In the above vehicle lamp, a center position of the first array light source may be arranged at a position different from a center position of the second array light source in a left-right direction of the lamp.

According to the above configuration, the degree of design freedom of the light distribution patterns in the left-right direction of the lamp may be improved, so that the road surface illumination function can be enhanced, for example.

According to another illustrative embodiment of the present invention, there is provided a vehicle lamp including:

a projection lens including an output surface having a convex shape based on one circular arc;

a first light source arranged at a rear of the projection lens; and a second light source arranged at the rear of the projection lens, wherein the projection lens has a first back focal point and a second back focal point, wherein the first light source is arranged at a position corresponding to the first back focal point, and wherein the second light source is arranged at a position corresponding to the second back focal point.

According to the above configuration, since the output surface of the projection lens has a convex shape based on a single circular arc and the first light source and the second light source are arranged at the rear of the projection lens, it may be possible to keep an aesthetic quality of an outward appearance, when seeing the lamp from the front. Also, since the first light source is arranged at the position corresponding to the first back focal point and the second light source is arranged at the position corresponding to the second back focal point, it may be possible to illuminate the lights ahead of the lamp, which are to be emitted from the first light source and the second light source, as clear light distribution patterns, and to improve the degree of design freedom of the light distribution patterns.

In the above vehicle lamp, the first light source and the second light source may be arranged in an upper-lower direction.

According to the above configuration, it may be possible to improve the degree of design freedom of the light distribution patterns in the upper-lower direction of the lamp while suppressing the lamp from increasing in size in the left-right direction.

In the above vehicle lamp, the projection lens may include a first lens part configured to form the first back focal point and a second lens part configured to form the second back focal point, the first lens part may be formed below the second lens part, the first back focal point may be located above the second back focal point, the first light source may be configured to emit light towards an incident surface of the first lens part, and the second light source may be configured to emit light towards an incident surface of the second lens part.

According to the above configuration, after the light to be emitted from the first light source towards the incident surface of the projection lens and the light to be emitted from the second light source towards the incident surface of the projection lens are enabled to intersect with each other in the upper-lower direction, the lights are illuminated ahead of the lamp from the projection lens, so that the degree of design freedom of the light distribution patterns may be improved.

In the above vehicle lamp, the first light source and the second light source may be arranged in a left-right direction.

According to the above configuration, it may be possible to improve the degree of design freedom of the light distribution patterns in the left-right direction of the lamp while suppressing the lamp from increasing in size in the upper-lower direction.

In the above vehicle lamp, the projection lens may include a first lens part configured to form the first back focal point and a second lens part configured to form the second back focal point, the first lens part may be formed at a left side relative to the second lens part, the first back focal point is located at a right side relative to the second back focal point, the first light source may be configured to emit light towards an incident surface of the first lens part, and the second light source may be configured to emit light towards an incident surface of the second lens part.

According to the above configuration, after the light to be emitted from the first light source towards the incident surface of the projection lens and the light to be emitted from the second light source towards the incident surface of the projection lens are enabled to intersect with each other in the left-right direction, the lights are illuminated ahead of the lamp from the projection lens, so that the degree of design freedom of the light distribution patterns may be improved.

In the above vehicle lamp, the projection lens may include a first lens part configured to form the first back focal point and a second lens part configured to form the second back focal point, and the vehicle lamp may further include:

a first reflection part configured to reflect the light emitted from the first light source towards an incident surface of the first lens part; and a second reflection part configured to reflect the light emitted from the second light source towards an incident surface of the second lens part.

According to the above configuration, it may be possible to illuminate the lights ahead of the lamp, which are to be emitted from the first light source and the second light source, as clearer light distribution patterns.

In the above vehicle lamp, the first light source may be a first array light source including a plurality of semiconductor light emitting elements aligned in at least one row, the second light source may be a second array light source including a plurality of semiconductor light emitting elements aligned in at least one row, and a center position of the first array light source may be arranged at a position different from a center position of the second array light source in a left-right direction of the lamp.

According to the above configuration, it may be possible to improve the degree of design freedom of the light distribution patterns in the left-right direction of the lamp.

The above vehicle lamp may further include:

a base member; and a rigid circuit board, on which the first array light source and the second array light source are mounted, wherein the rigid circuit board may be mounted to the base member.

According to the above configuration, it may be possible to easily arrange the first array light source and the second array light source at predetermined positions of the base member.

The above vehicle lamp may further include:

a base member, and a flexible circuit board, on which the first array light source and the second array light source are arranged, wherein at least a part of the flexible circuit board may be fixed to the base member.

According to the above configuration, the operability may be improved upon the mounting of the first array light source and the second array light source to the base member.

According to a further illustrative embodiment, there is provided a vehicle lamp including:

a first light source configured to emit light for forming a light distribution pattern for low beam;

a first array light source including a plurality of semiconductor light emitting elements aligned in at least one row; and a second array light source including a plurality of semiconductor light emitting elements aligned in at least one row, wherein the first array light source is configured to emit light for forming at least a part of an additional light distribution pattern for high beam, and wherein the second array light source is configured to emit light for forming an additional light distribution pattern that is to overlap with both the light distribution pattern for low beam and the additional light distribution pattern for high beam on a vertical virtual screen ahead of the lamp.

According to the above configuration, it may be possible to widen a width within which the light emitted from the lamp is to be illuminated to the road surface and to illuminate the light to a distant position by the light that is to form the additional light distribution pattern, which is to overlap with both the light distribution pattern for low beam and the additional light distribution pattern for high beam.

In the above vehicle lamp, the plurality of semiconductor light emitting elements of the first array light source may be configured to be individually lit on and off, the plurality of semiconductor light emitting elements of the second array light source may be configured to be individually lit on and off, and in light distribution patterns to be projected on a vertical virtual screen ahead of the lamp, a light distribution pattern which is to be formed by the respective semiconductor light emitting elements of the first array light source and a light distribution pattern which is to be formed by the respective semiconductor light emitting elements of the second array light source may be offset in a left-right direction of the lamp.

According to the above configuration, the light distribution pattern, which is to be formed by the respective semiconductor light emitting elements of the first array light source, and the light distribution pattern, which is to be formed by the respective semiconductor light emitting elements of the second array light source, are offset in the left-right direction of the lamp. For this reason, it may be possible to increase the number of divisions in the light distribution patterns, which are configured by the first array light source and the second array light source, and to improve the resolutions thereof, so that it may be possible to form a variety of light distribution patterns, depending on utilities or situations.

In the above vehicle lamp, a center position of the first array light source may be arranged at a position different from a center position of the second array light source in a left-right direction of the lamp.

According to the above configuration, it may be possible to widen a region of the road surface in the left-right direction of the lamp, to which the light is to be illuminated, and to increase the number of divisions of the light distribution patterns, which are configured by the first array light source and the second array light source.

The above vehicle lamp may further include:

a projection lens, wherein the first array light source may be arranged at a rear of the projection lens, and wherein respective arrangement pitches of the plurality of semiconductor light emitting elements of the first array light source in a left-right direction of the lamp may be smaller towards a back focal point of the projection lens.

According to the above configuration, it may be possible to increase a using efficiency of the light to be emitted from the first array light source while widening the width in which the light emitted from the lamp is to be illuminated to the road surface, so that it is possible to illuminate the light to a distant position.

According to a further illustrative embodiment of the present invention, there is provided a vehicle lamp including:

a projection lens having a plurality of focal points;

a first array light source arranged at a rear of the projection lens and including a plurality of semiconductor light emitting elements aligned in at least one row; and a second array light source arranged at the rear of the projection lens and including a plurality of semiconductor light emitting elements aligned in at least one row, wherein the first array light source and the second array light source are arranged in an upper-lower direction, wherein the plurality of semiconductor light emitting elements of the first array light source are configured to be individually lit on and off, wherein the plurality of semiconductor light emitting elements of the second array light source are configured to be individually lit on and off, and wherein in light distribution patterns to be projected on a vertical virtual screen ahead of the lamp, a light distribution pattern which is to be formed by the respective semiconductor light emitting elements of the first array light source and a light distribution pattern which is to be formed by the respective semiconductor light emitting elements of the second array light source are offset in a left-right direction of the lamp.

According to the above configuration, the vehicle lamp includes the first array light source and the second array light source, and the first array light source and the second array light source are arranged in the upper-lower direction. For this reason, it is possible to mount more semiconductor light emitting elements to the lamp without increasing a width of the lamp in the left-right direction. Also, the light distribution pattern, which is to be formed by the respective semiconductor light emitting elements of the first array light source, and the light distribution pattern, which is to be formed by the respective semiconductor light emitting elements of the second array light source, are offset in the left-right direction of the lamp. For this reason, it may be possible to increase the number of divisions in the light distribution patterns, which are configured by the first array light source and the second array light source, and to improve the resolutions thereof, so that it may be possible to form a variety of light distribution patterns, depending on utilities or situations.

In the above vehicle lamp, the projection lens may have a first back focal point and a second back focal point, the first array light source may be arranged at a position corresponding to the first back focal point, and the second array light source may be arranged at a position corresponding to the second back focal point.

According to the above configuration, it may be possible to illuminate the lights ahead of the lamp, which are to be emitted from the first array light source and the second array light source, as clear light distribution patterns, respectively.

In the above vehicle lamp, the projection lens may include a first lens part configured to form the first back focal point and a second lens part configured to form the second back focal point, and a convex portion protruding towards a rear of the lamp may be formed at a boundary part between an incident surface of the first lens part and an incident surface of the second lens part.

According to the above configuration, since focal areas that are to be formed by the convex portion are dispersed, the lights that are to pass through the convex portion and are to be illuminated ahead of the lamp diffuse, so that a boundary between an illumination area and a non-illumination area to be formed ahead of the lamp may be made blurry.

In the above vehicle lamp, the projection lens may include a first lens part configured to form the first back focal point and a second lens part configured to form the second back focal point, and the vehicle lamp may further include:

a first reflection part configured to reflect the light emitted from the first array light source towards an incident surface of the first lens part; and a second reflection part configured to reflect the light emitted from the second array light source towards an incident surface of the second lens part.

According to the above configuration, it may be possible to illuminate the lights ahead of the lamp, which are to be emitted from the first light source and the second light source, as the clearer light distribution patterns, respectively.

The above vehicle lamp may further include:

a base member, on which the first array light source and the second array light source mounted; and an optical member which is a component separate from the base member and is formed with a first opening through which the first array light source is to be exposed ahead of the lamp and a second opening through which the second array light source is to be exposed ahead of the lamp at a state where the optical member is mounted to the base member, wherein the optical member may include the first reflection part and the second reflection part.

According to the above configuration, the optical member is mounted to the base member, so that it may be possible to illuminate the lights ahead of the lamp, which are to be emitted from the first light source and the second light source, as the clearer light distribution patterns, respectively.

In the above vehicle lamp, a light output part of each semiconductor light emitting element of the first array light source may be configured to face towards a direction different from a light output part of each semiconductor light emitting element of the second array light source in an upper-lower direction of the lamp.

According to the above configuration, it may be possible to easily form the light distribution pattern by using each array light source, depending on the utilities or situations.

The above vehicle lamp may further include:

a base member; and a flexible circuit board, on which the first array light source and the second array light source are mounted, wherein a light output surface of each semiconductor light emitting element of the first array light source may face towards a direction different from a light output surface of each semiconductor light emitting element of the second array light source in an upper-lower direction of the lamp at a state where the flexible circuit board is mounted to the base member.

According to the above configuration, the flexible circuit board is used, so that the restraint may be reduced when arranging each array light source at a predetermined posture. Therefore, the degree of design freedom of the light distribution pattern, which is configured by each array light source, may be improved.

The above vehicle lamp may further include:

a base member; and a rigid circuit board, on which the first array light source and the second array light source mounted, wherein the rigid circuit board may be mounted to the base member.

According to the above configuration, it may be possible to easily arrange the first array light source and the second array light source at predetermined positions of the base member.

In the above vehicle lamp, the projection lens may include a first lens part configured to form the first back focal point and a second lens part configured to form the second back focal point, the first lens part may be formed below the second lens part, the first array light source may be arranged above the second array light source, the first array light source may be configured to emit light towards an incident surface of the first lens part, and the second array light source may be configured to emit light towards an incident surface of the second lens part.

According to the above configuration, after the light to be emitted from the first light source towards the incident surface of the projection lens and the light to be emitted from the second light source towards the incident surface of the projection lens are enabled to intersect with each other in the upper-lower direction, the lights may be illuminated ahead of the lamp from the projection lens.

In the above vehicle lamp, a center position of the first array light source may be arranged at a position different from a center position of the second array light source in the left-right direction of the lamp.

According to the above configuration, the degree of design freedom of the light distribution patterns in the left-right direction of the lamp may be improved, so that the road surface illumination function may be enhanced, for example.

According to an illustrative embodiment of the present invention, it may be possible to provide the vehicle lamp capable of improving the degree of design freedom of the light distribution pattern that is to be added to the predetermined light distribution pattern, while suppressing the lamp from increasing in size.

Also, according to an illustrative embodiment of the present invention, it may be possible to provide the vehicle lamp capable of improving the degree of design freedom of the light distribution patterns while keeping the aesthetic quality of the lamp.

Also, according to an illustrative embodiment of the present invention, it may be possible to provide the vehicle lamp capable of enhancing the road surface illumination function.

Also, according to an illustrative embodiment of the present invention, it may be possible to provide the vehicle lamp capable of forming a variety of light distribution patterns while suppressing the lamp from increasing in size.

BRIEF DESCRIPTION OF THE DRAWINGS

The above and other aspects of the present invention will become more apparent and more readily appreciated from the following description of illustrative embodiments of the present invention taken in conjunction with the attached drawings, in which:

FIGS. 2A to 2C depict a vehicle lamp according to an illustrative embodiment of the present invention, in which FIG. 2A is a left side view, FIG. 2B is a front view and FIG. 2C is a right side view;

FIGS. 6A and 6B illustrate a structure having a first array light source, a second array light source and an optical member of the vehicle lamp, in which FIG. 6A is a front view and FIG. 6B is a sectional view taken along a line A-A of FIG. 6A;

DETAILED DESCRIPTION

Hereinafter, illustrative embodiments will be described in detail with reference to the drawings.

Figure 1:
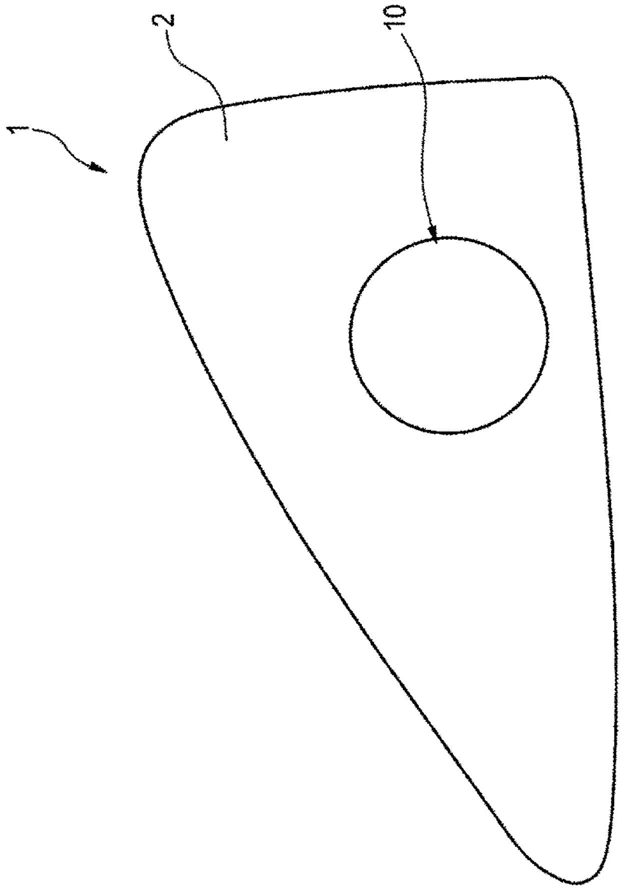
FIG. 1 is a schematic view of a headlight having a vehicle lamp according to an illustrative embodiment of the present invention, as seen from front.
Figure 2A:
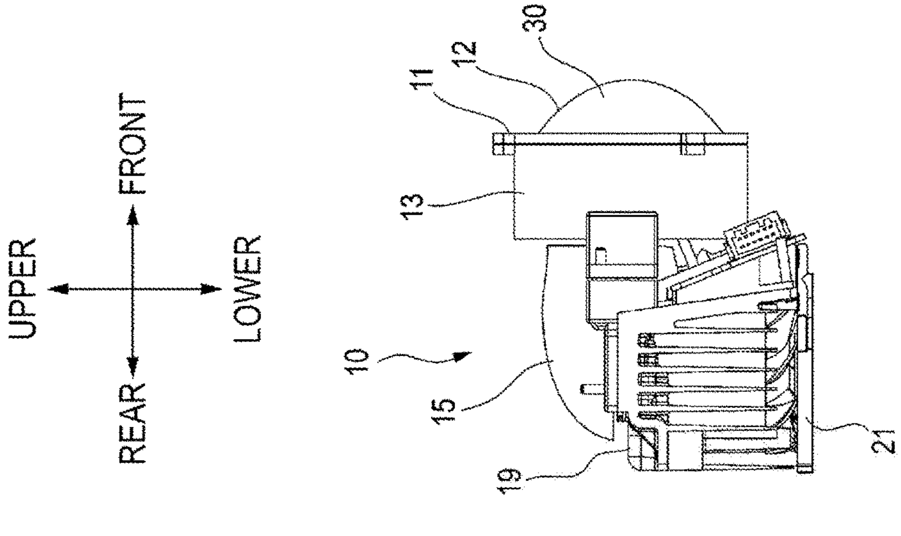
Figure 2B:
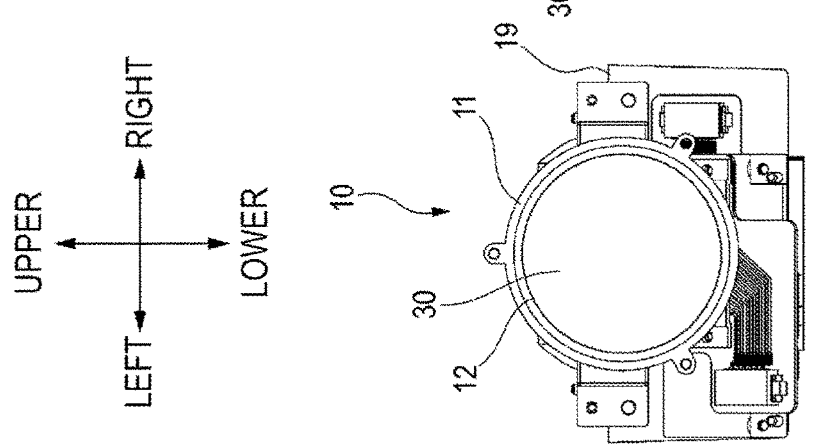
Figure 2C:
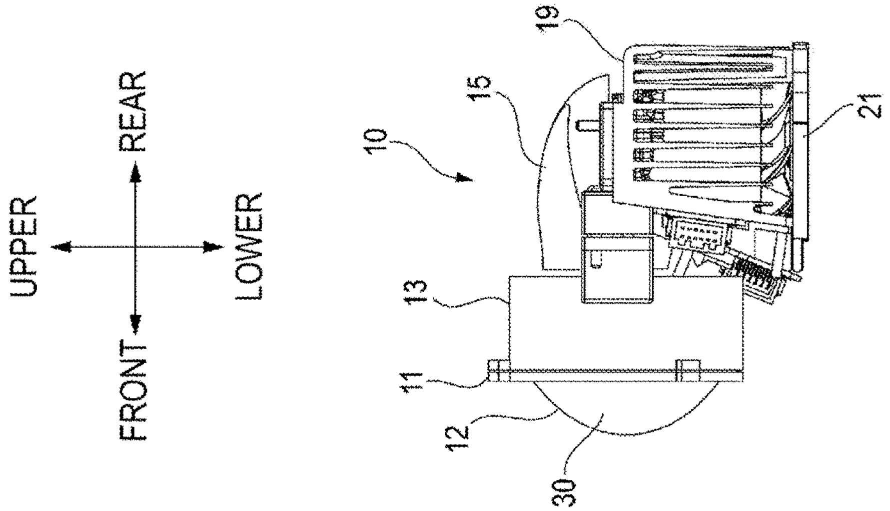
Figure 3:
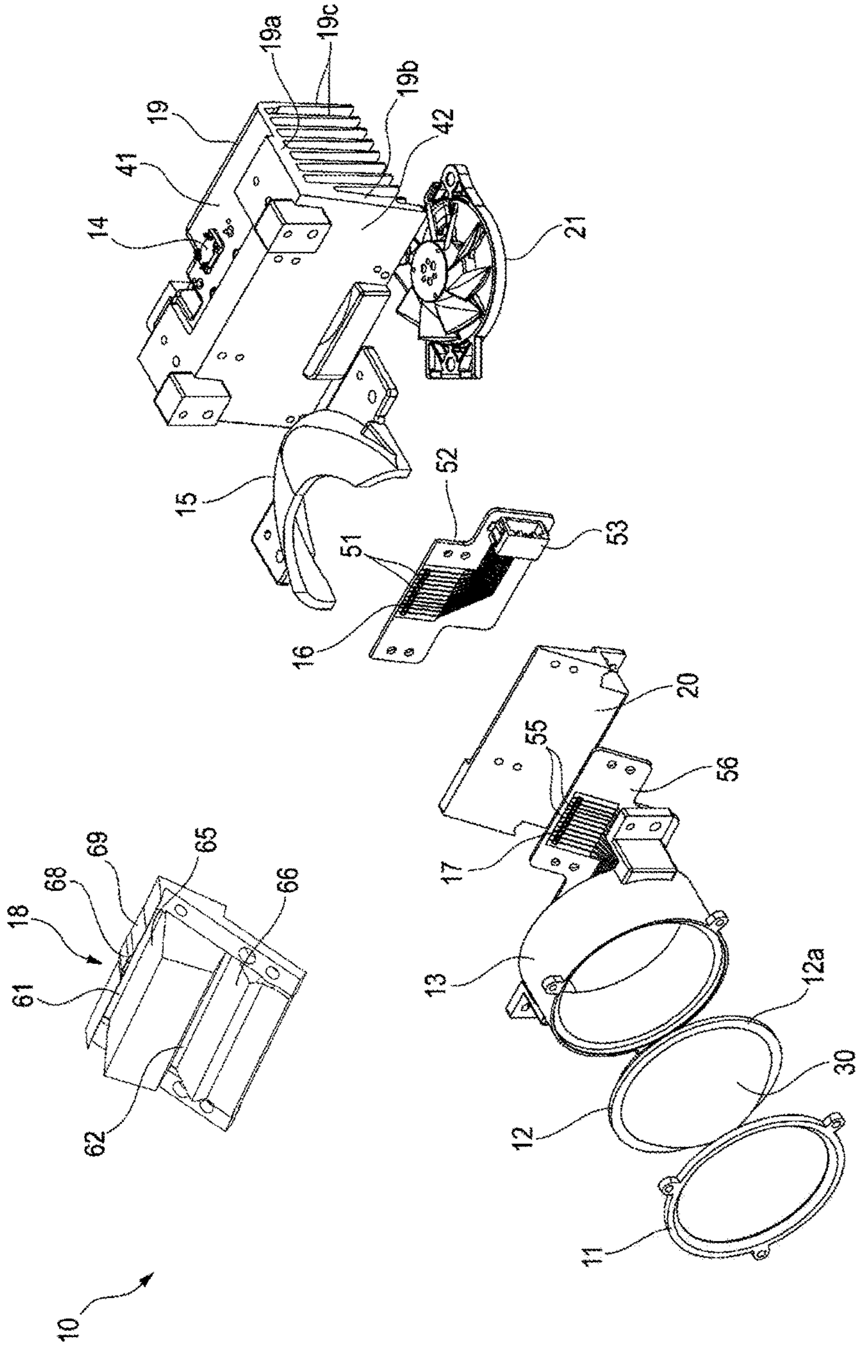
FIG. 3 is an exploded perspective view of the vehicle lamp according to the illustrative embodiment of the present invention.
Figure 4:
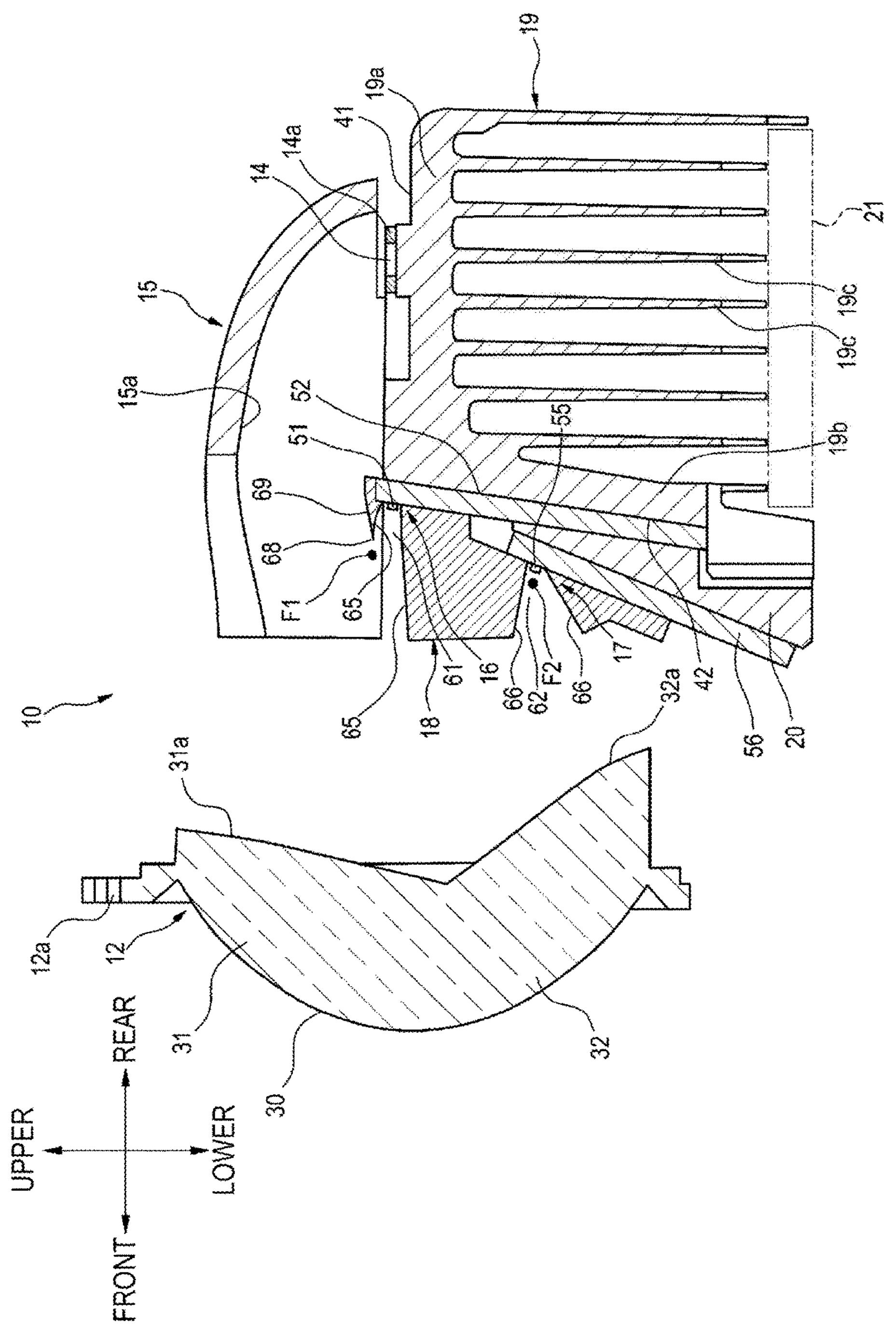
FIG. 4 is a sectional view of the vehicle lamp according to the illustrative embodiment of the present invention.

As shown in FIG. 1, a vehicle lamp 10 of the illustrative embodiment configures a headlight 1 of a vehicle. The headlight 1 is provided at left and right sides of a front part of the vehicle. Meanwhile, in FIG. 1, only the left headlight 1 of the vehicle is shown. In the illustrative embodiment, each headlight 1 is a monocular headlight having one vehicle lamp 10. The vehicle lamp 10 is provided in a lamp body (not shown). A transparent cover 2 is mounted in front of the lamp body. The transparent cover 2 is mounted to the lamp body to form a lamp chamber, and the vehicle lamp 10 is arranged in the lamp chamber.

As shown in FIGS. 2A to 4, the vehicle lamp 10 includes a fixing ring 11, a projection lens 12, a lens holder 13, a light source for low beam 14, a reflector 15, a first array light source 16, a second array light source 17, an optical member 18, a base member 19, a fixing member 20 and a fan 21.

The vehicle lamp 10 is a headlamp capable of selectively performing low beam illumination and high beam illumination and is configured as a projector-type lamp unit, for example.

The projection lens 12 has, on a front surface thereof, an output surface 30 having a convex shape based on a single circular arc. The projection lens 12 has a circular shape, as seen from the front of the lamp. The projection lens 12 has a first lens part 31 configured to form a first back focal point F1 and a second lens part 32 configured to form a second back focal point F2. The projection lens 12 has a configuration where the first lens part 31 has a first incident surface 31*a* at an opposite side to the output surface 30 and the second lens part 32 has a second incident surface 32*a* at an opposite side to the output surface 30.

The projection lens 12 is configured to form the first back focal point F1 on an optical axis of the first incident surface 31*a* of the first lens part 31 and to form the second back focal point F2 on an optical axis of the second incident surface 32*a* of the second lens part 32. The projection lens 12 is configured to project light source images, which are to be formed on respective focal surfaces including the first back focal point F1 and the second back focal point F2, on a vertical virtual screen ahead of the lamp, as reverted images. The first back focal point F1 and the second back focal point F2 are arranged in an upper-lower direction so that the first back focal point F1 is positioned above the second back focal point F2. That is, the projection lens 12 is a multifocal lens having the two back focal points F1, F2.

The projection lens 12 is arranged at a front part of the lens holder 13 having a cylindrical shape. The fixing ring 11 is fixed to the lens holder 13 from the front. The projection lens 12 is held at an outer peripheral flange portion 12*a* by the lens holder 13 and the fixing ring 11, so that it is supported to the front part of the lens holder 13. The lens holder 13 configured to support the projection lens 12 is fixed to the base member 19. Thereby, the projection lens 12 is supported to the base member 19 via the lens holder 13.

The base member 19 is formed of a metal material having excellent thermal conductivity such as aluminum, for example. The base member 19 has an upper wall part 19*a* having a horizontal plane shape and an inclined wall part 19*b* extending obliquely in a lower and front direction from a front end of the upper wall part 19*a*. On the upper wall part 19*a*, a plurality of heat radiation fins 19*c* extending downwards from a lower surface of the upper wall part is arranged side by side in a front-rear direction. The fan 21 is arranged below the base member 19. The wind generated from the fan 21 is sent to the heat radiation fins 19*c* extending downwards, from below.

The base member 19 has a configuration where an upper surface of the upper wall part 19*a* is a first surface 41 and a front surface of the inclined wall part 19*b* is a second surface 42. In the base member 19, a light source for low beam 14 is arranged on the first surface 41, and a first array light source 16 and a second array light source 17 are arranged on the second surface 42.

The light source for low beam 14 has a white light emitting diode, and an upper surface thereof is configured as a light emitting surface. The light source for low beam 14 is arranged at the rear of the projection lens 12 and is configured to emit light for forming a light distribution pattern for low beam, in the illustrative embodiment. The light source for low beam 14 is fixed to the first surface 41 of the upper wall part 19*a* of the base member 19 via an attachment 14*a*.

The reflector 15 is fixed to the first surface 41 of the upper wall part 19*a* of the base member 19 so as to cover the light source for low beam 14 from above. The reflector 15 has an inner surface configured as a reflective surface 15*a*, and the reflective surface 15*a* is configured to reflect the light emitted from the light source for low beam 14 towards the projection lens 12. The reflective surface 15*a* is configured as a curved surface having a substantially elliptical shape of which a focal point is a center of light emission of the light source for low beam 14, and eccentricity thereof is set to gradually increase from a vertical section towards a horizontal section.

Figure 5:
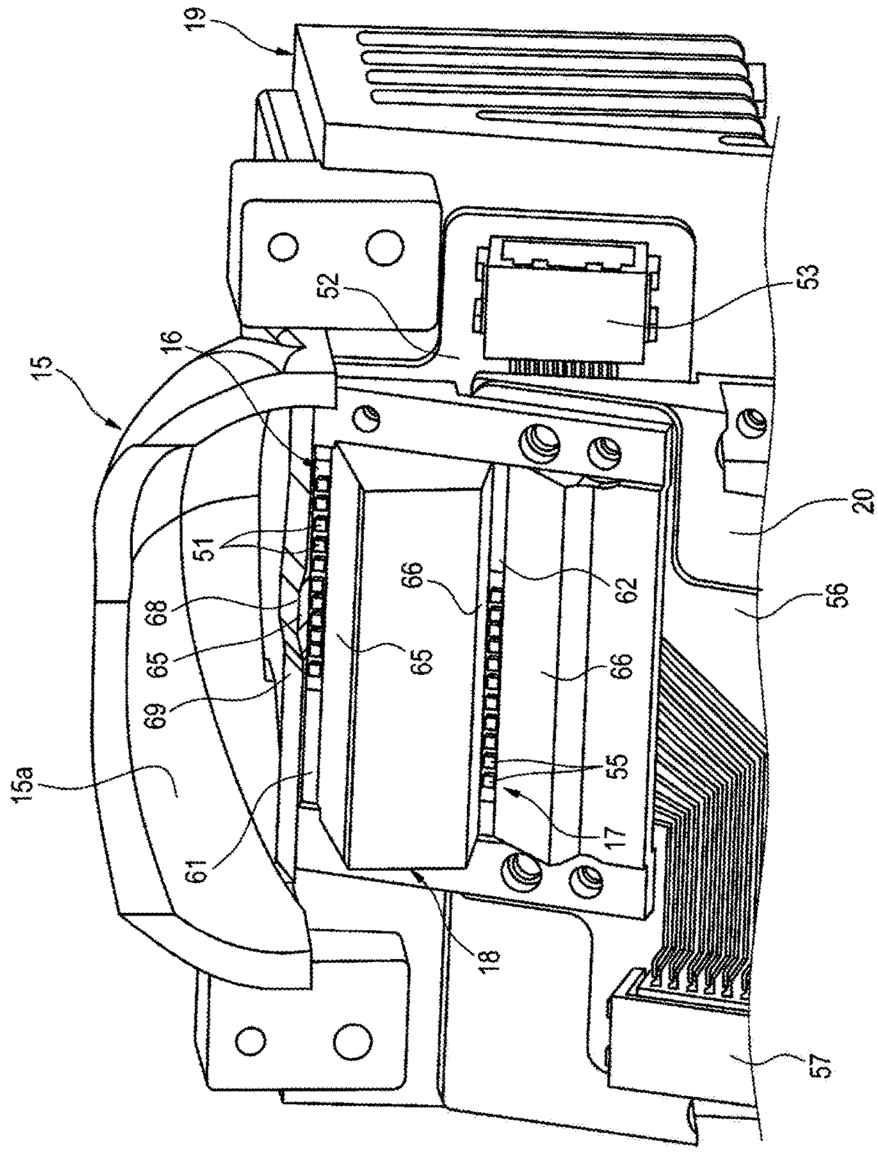
FIG. 5 is a perspective view of a base member on which a light source of the vehicle lamp is mounted.
Figure 6B:
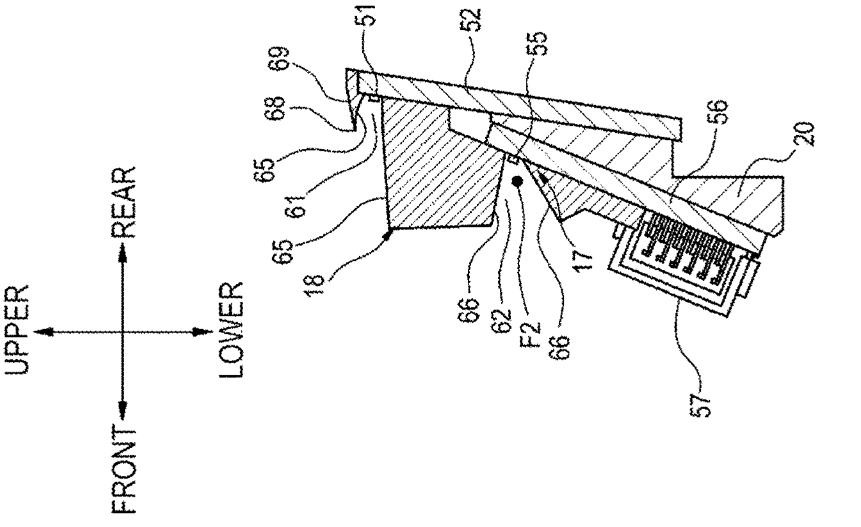
Figure 6A:
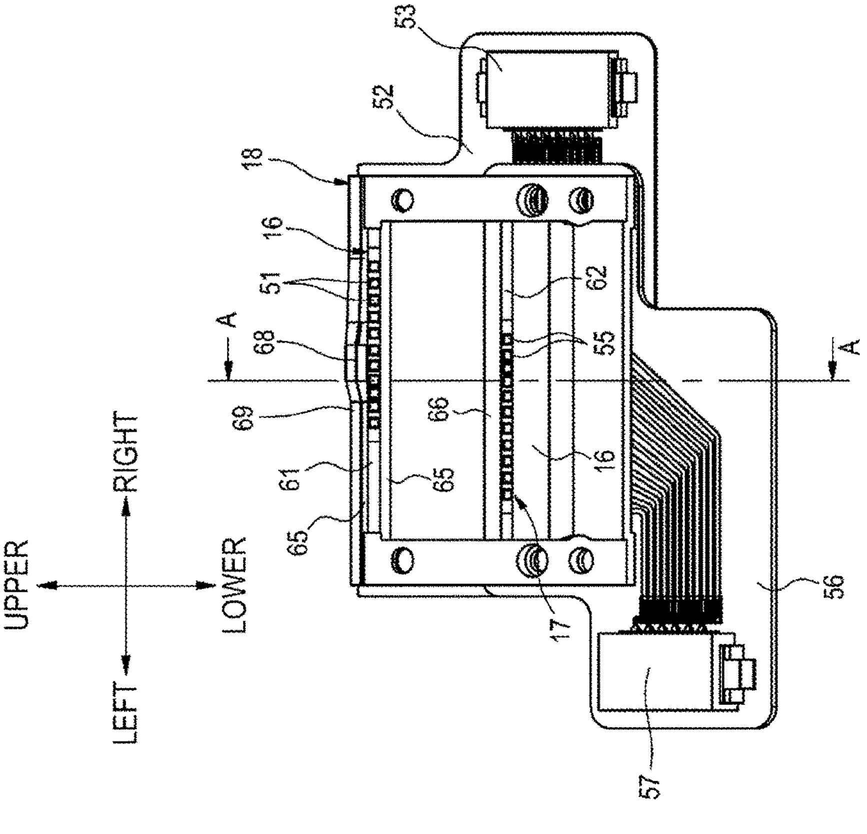

As shown in FIGS. 5, 6A and 6B, the first array light source 16 has a plurality of (eleven, in the illustrative embodiment) semiconductor light emitting elements 51 and a circuit board 52. The first array light source 16 is arranged at the rear of the projection lens 12. The semiconductor light emitting elements 51 are arranged in one row in the left-right direction. On the other hand, the semiconductor light emitting elements 51 may also be arranged in two or more rows. The semiconductor light emitting element 51 is configured by a white light emitting diode, for example, and has a light output part configured by a light emitting surface having a square shape, for example. Also, in the first array light source 16, respective arrangement pitches of the plurality of semiconductor light emitting elements 51 in the left-right direction of the lamp are smaller towards the first back focal point F1 of the projection lens 12.

The semiconductor light emitting elements 51 are mounted on the circuit board 52. The circuit board 52 is provided with a connector 53. The connector 53 is arranged at a right side of the circuit board 52, as seen from front. The connector 53 is connected with the other party connector (not shown) provided at a power feeding line, and power is fed from the power feeding line to the semiconductor light emitting elements 51. The plurality of semiconductor light emitting elements 51 of the first array light source 16 is configured to be individually lit on and off.

The circuit board 52 having the semiconductor light emitting elements 51 mounted thereon is supported on the second surface 42, which is the front surface of the inclined wall part 19*b* of the base member 19. The first array light source 16 is arranged at a position corresponding to the first back focal point F1 of the projection lens 12. In the meantime, the position corresponding to the first back focal point F1 is not limited to a position that completely coincides with the first back focal point F1, and indicates a position including the first back focal point F1, which is to be projected as a reverted image on the vertical virtual screen ahead of the lamp by the projection lens 12, and a surrounding of the first back focal point.

The first array light source 16 is arranged so that the light output parts configured by the light emitting surfaces of the semiconductor light emitting elements 51 are to face obliquely in a front and upper direction by mounting the circuit board 52 on the inclined second surface 42. Also, the first array light source 16 is arranged so that the light output parts of the semiconductor light emitting elements 51 are located below the first back focal point F1. That is, the second surface 42 of the base member 19 is configured as an inclined surface inclined relative to the optical axis of the first incident surface 31*a* of the projection lens 12 so that the light output part of the first array light source 16 is located below the first back focal point F1. Also, the first array light source 16 is arranged between the first back focal point F1 of the projection lens 12 and the light source for low beam 14 in the front-rear direction of the lamp (refer to FIG. 4 and the like).

The second array light source 17 has a plurality of (eleven, in the illustrative embodiment) semiconductor light emitting elements 55 and a circuit board 56. The second array light source 17 is arranged at the rear of the projection lens 12. The semiconductor light emitting elements 55 are arranged in one row in the left-right direction. On the other hand, the semiconductor light emitting elements 55 may also be arranged in two or more rows. The semiconductor light emitting element 55 is configured by a white light emitting diode, for example, and has a light output part configured by a light emitting surface having a square shape, for example.

The semiconductor light emitting elements 55 are mounted on the circuit board 56. The circuit board 56 is provided with a connector 57. The connector 57 is arranged at a left side of the circuit board 56, as seen from front. The connector 57 is connected with the other party connector (not shown) provided at a power feeding line, and power is fed from the power feeding line to the semiconductor light emitting elements 55. The plurality of semiconductor light emitting elements 55 of the second array light source 17 is configured to be individually lit on and off.

The circuit board 56 having the semiconductor light emitting elements 55 mounted thereon is supported on the second surface 42, which is the front surface of the inclined wall part 19*b* of the base member 19, via the fixing member 20. The fixing member 20 has a tapered shape so that a thickness thereof gradually decreases towards the upper. The second array light source 17 supported on the second surface 42 of the base member 19 via the fixing member 20 is arranged at a position corresponding to the second back focal point F2 of the projection lens 12. In the meantime, the position corresponding to the second back focal point F2 is not limited to a position that completely coincides with the second back focal point F2, and indicates a position including the second back focal point F2, which is to be projected as a reverted image on the vertical virtual screen ahead of the lamp by the projection lens 12, and a surrounding of the second back focal point.

The first array light source 16 and the second array light source 17 are arranged in the upper-lower direction. Specifically, the first array light source 16 is arranged above the second array light source 17. Also, the second array light source 17 is fixed to the second surface 42 of the base member 19 via the fixing member 20 of which a thickness gradually decreases towards the upper, so that it is inclined more sharply than the first array light source 16. Thereby, the light output part configured by the light emitting surface of each semiconductor light emitting element 55 of the second array light source 17 faces more upwards than the light output part configured by the light emitting surface of each semiconductor light emitting element 51 of the first array light source 16. That is, the light output part of each semiconductor light emitting element 51 of the first array light source 16 is configured to face towards a direction different from the light output part of each semiconductor light emitting element 55 of the second array light source 17, in the upper-lower direction of the lamp.

A center position of the first array light source 16 is arranged at a right side of a center position of the lamp, as seen from front, and a center position of the second array light source 17 is arranged at a left side of the center position of the lamp, as seen from front. Thereby, the center position of the first array light source 16 is arranged at a position different from the center position of the second array light source 17 in the left-right direction of the lamp.

The optical member 18 is a separate component from the base member 19 having the first array light source 16 and the second array light source 17 mounted thereon, and is mounted at a front side of the first array light source 16 and the second array light source 17 supported to the base member 19. The optical member 18 is formed of aluminum die-cast or polycarbonate resin having excellent heat resistance, for example.

The optical member 18 is formed with a first opening 61 and a second opening 62. The first opening 61 and the second opening 62 are formed in a width direction of the optical member 18. At a state where the optical member 18 is supported to the base member 19, the first opening 61 is arranged at a position corresponding to the first array light source 16 and the second opening 62 is arranged at a position corresponding to the second array light source 17. Thereby, the first array light source 16 is exposed ahead of the lamp through the first opening 61 of the optical member 18, and the second array light source 17 is exposed ahead of the lamp through the second opening 62 of the optical member 18.

The optical member 18 has a vertical wall surface, which forms a vertical edge portion of the first opening 61 and is configured as a first reflective surface 65. The first reflective surface 65 is configured to reflect the light emitted from the first array light source 16 towards the first incident surface 31*a* of the projection lens 12. Also, the optical member 18 has a vertical wall surface, which forms a vertical edge portion of the second opening 62 and is configured as a second reflective surface 66. The second reflective surface 66 is configured to reflect the light emitted from the second array light source 17 towards the second incident surface 32*a* of the projection lens 12. The first reflective surface 65 and the second reflective surface 66 have been mirror-finished by aluminum vapor deposition or the like.

The optical member 18 has a shade part 68 at an upper part thereof. The shade part 68 functions as a shade configured to shade a part of the light from the light source for low beam 14 reflected on the reflective surface 15*a* of the reflector 15 and to thereby form a cutoff line of the light distribution pattern for low beam. An upper surface of the shade part 68 forms a reflective surface 69 configured to reflect upwards a part of the light from the light source for low beam 14 reflected on the reflective surface 15*a* of the reflector 15. The reflective surface 69 is formed to be slightly inclined in a front and lower direction with respect to a horizontal plane, and is configured to enable the reflected light to be incident on the first incident surface 31*a* of the projection lens 12. The reflective surface 69 has been mirror-finished by aluminum vapor deposition or the like.

Figure 7:
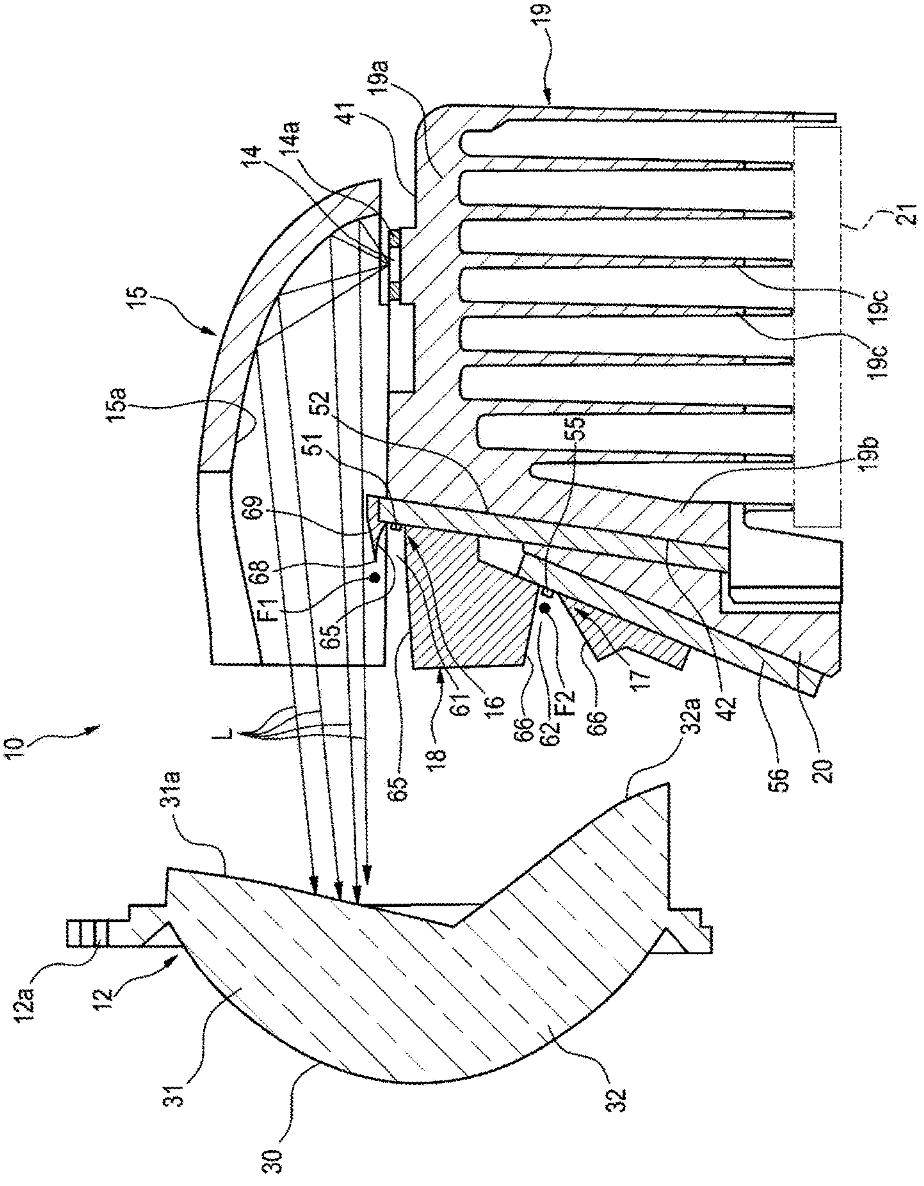
FIG. 7 is a sectional view depicting a light path of a light source for low beam of the vehicle lamp.

As shown in FIG. 7, the light L emitted from the light source for low beam 14 is reflected on the reflective surface 15*a* of the reflector 15 and is then incident on the first incident surface 31*a* of the projection lens 12. Also, a part of the light L reflected on the reflective surface 15*a* of the reflector 15 is reflected on the reflective surface 69 of the optical member 18 and is then incident on the first incident surface 31*a* of the projection lens 12. In the meantime, a part of the light L reflected on the reflective surface 15*a* of the reflector 15 passes by the first back focal point F1.

Figure 8:
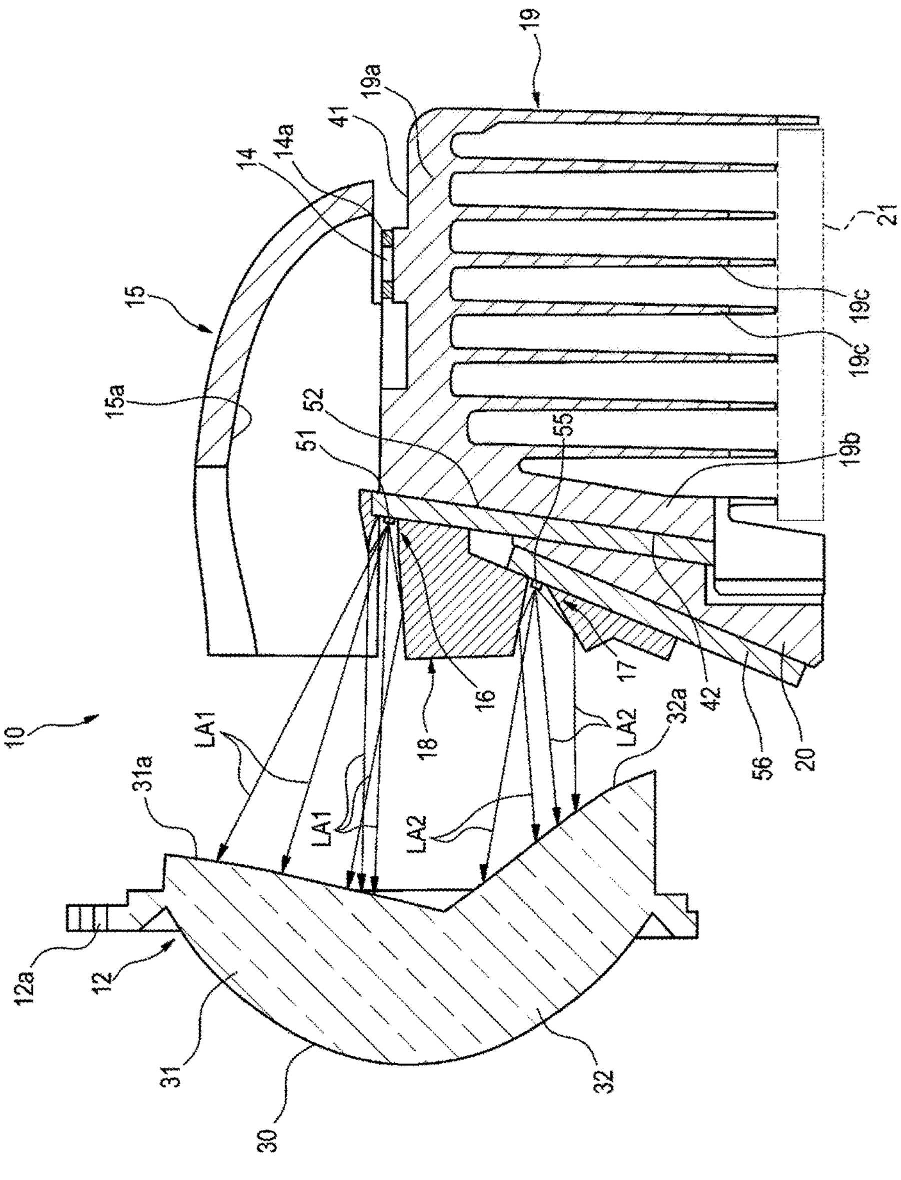
FIG. 8 is a sectional view depicting light paths of the first array light source and the second array light source of the vehicle lamp.

As shown in FIG. 8, the light LA1 emitted from the first array light source 16 is directly incident on the first incident surface 31*a* of the projection lens 12 or is reflected on the first reflective surface 65 of the optical member 18 and is then incident on the first incident surface 31*a* of the projection lens 12. The light LA2 emitted from the second array light source 17 is directly incident on the second incident surface 32*a* of the projection lens 12 or is reflected on the second reflective surface 66 of the optical member 18 and is then incident on the second incident surface 32*a* of the projection lens 12.

Figure 9:
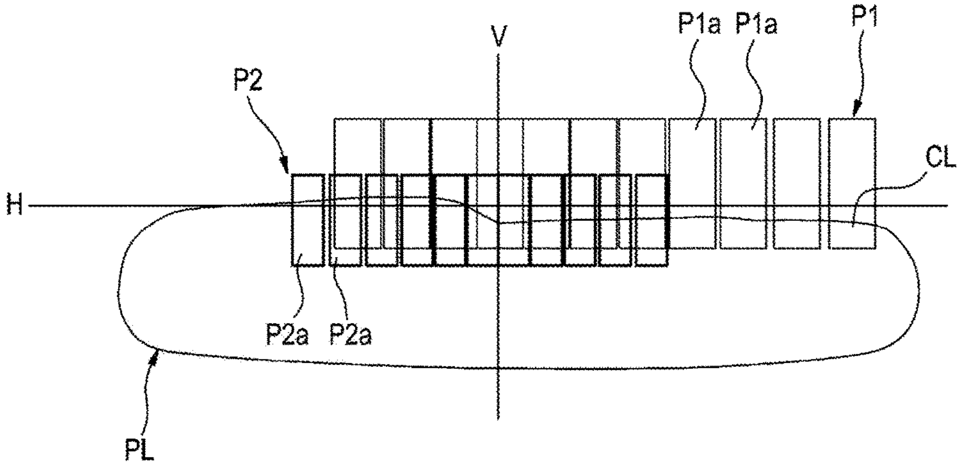
FIG. 9 is a schematic view depicting a light distribution pattern, which is to be formed on a vertical virtual screen arranged ahead of the lamp by light to be illuminated from the vehicle lamp, in a projective manner.

FIG. 9 depicts a light distribution pattern projected on a virtual screen provided in a vertical direction at 25*m* ahead of the lamp. As shown in FIG. 9, the light L emitted from the light source for low beam 14 and incident on the first incident surface 31*a* of the projection lens 12 is emitted from the output surface 30 and forms a light distribution pattern for low beam PL. The light distribution pattern for low beam PL is formed with a cutoff line CL by the shade part 68.

The light LA1 emitted from the first array light source 16 and incident on the first incident surface 31*a* of the projection lens 12 is emitted from the output surface 30 and forms an additional light distribution pattern P1. The additional light distribution pattern P1 is a light distribution pattern in which light distribution patterns P1*a* of the respective semiconductor light emitting elements 51 of the first array light source 16 are aligned in one row in a horizontal direction. Herein, since the respective arrangement pitches of the semiconductor light emitting elements 51 of the first array light source 16 in the left-right direction of the lamp are smaller towards the first back focal point F1 of the projection lens 12, a central part of the additional light distribution pattern P1 has higher illuminance, so that the light is illuminated to a distant position.

The light LA2 emitted from the second array light source 17 and incident on the second incident surface 32*a* of the projection lens 12 is emitted from the output surface 30 and forms an additional light distribution pattern P2. The additional light distribution pattern P2 is a light distribution pattern in which light distribution patterns P2*a* of the respective semiconductor light emitting elements 55 of the second array light source 17 are aligned in one row in the horizontal direction.

The additional light distribution pattern P1, which is to be formed by the light LA1 from the first array light source 16, is a light distribution pattern for high beam. The additional light distribution pattern P2, which is to be formed by the light LA2 from the second array light source 17, overlaps with both the light distribution pattern for low beam PL, which is to be formed by the light L from the light source for low beam 14, and the additional light distribution pattern for high beam P1, which is to be formed by the light LA1 from the first array light source 16, on the vertical virtual screen ahead of the lamp.

Here, in a space between the light distribution pattern for low beam PL of which the cutoff line is to be formed by the shade part 68 of the optical member 18 and the additional light distribution pattern for high beam P1, it is difficult to make the light overlap and the light may not overlap in some cases, so that an amount of light may be reduced.

On the contrary, according to the vehicle lamp 10 of the illustrative embodiment, at a state where the light distribution pattern for low beam PL is formed and the additional light distribution pattern P1, which is a light distribution pattern for high beam, is also formed, the additional light distribution pattern P2 is formed between the light distribution pattern for low beam PL and the additional light distribution pattern P1, in which the amount of light is reduced. Thereby, the space between the light distribution pattern for low beam PL and the additional light distribution pattern P1, in which the amount of light is reduced, is compensated by the additional light distribution pattern P2.

Also, regarding the light distribution patterns to be projected on the vertical virtual screen ahead of the lamp, the additional light distribution pattern P1, which is to be formed by the light LA1 emitted from each semiconductor light emitting element 51 of the first array light source 16, and the additional light distribution pattern P2, which is to be formed by the light LA2 emitted from each semiconductor light emitting element 55 of the second array light source 17, are offset in the left-right direction.

Specifically, the additional light distribution pattern P1 that is to be formed by the first array light source 16 is formed at the right of center and the additional light distribution pattern P2 that is to be formed by the second array light source 17 is formed at the left of center. In the meantime, herein, the term "offset" indicates a meaning including a configuration where the light distribution patterns P1*a* and the light distribution patterns P2*a* are to be arranged to partially overlap with each other in the left-right direction and a configuration where the light distribution patterns P1*a* and the light distribution patterns P2*a* are to be alternately arranged without overlapping with each other in the left-right direction.

Figure 10:
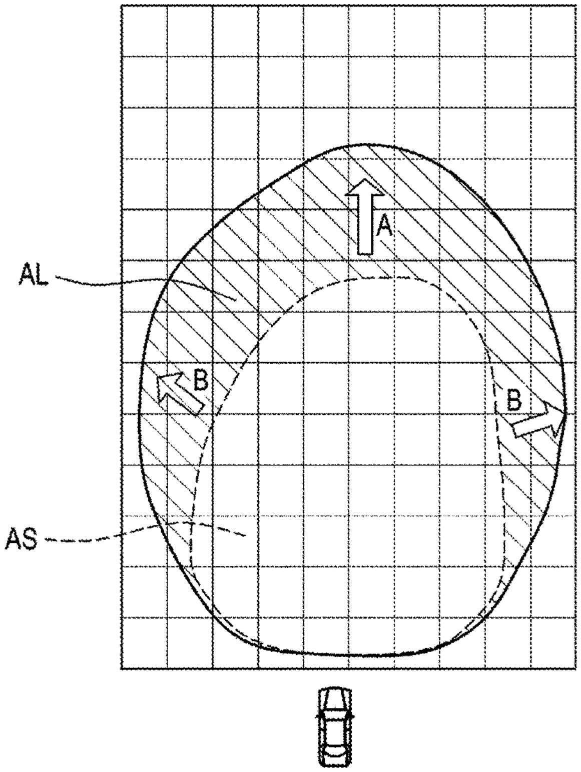
FIG. 10 is a schematic view depicting an illumination range in front of a vehicle by the light to be illuminated from the vehicle lamp, as seen from above.

Thereby, as shown in FIG. 10, as compared to a road surface illumination region AS by a general vehicle lamp, according to the illustrative embodiment, the amount of light is compensated by the additional light distribution pattern P2 and the additional light distribution pattern P1 and the additional light distribution pattern P2 are offset in the left-right direction, so that a road surface illumination region AL enlarged in the front direction (an arrow A direction in FIG. 10) and the left-right direction (an arrow B direction in FIG. 10) is formed.

Also, since the semiconductor light emitting elements 51 of the first array light source 16 and the semiconductor light emitting elements 55 of the second array light source 17 are configured to be individually lit on and off, respectively, it is possible to form light distribution patterns in conformity to diverse situations. For example, in order for the light not to direct to an oncoming vehicle detected by an in-vehicle camera, the additional light distribution pattern P1 is formed by lighting off some of the semiconductor light emitting elements 51 of the first array light source 16 configured to illuminate a position of the oncoming vehicle, so that it is possible to widely illuminate a traveling road ahead of the vehicle within a range in which a glare is not to be caused to a driver of the oncoming vehicle. Also, the additional light distribution pattern P2 is formed by lighting off some of the semiconductor light emitting elements 55 of the second array light source 17 configured to illuminate the position of the oncoming vehicle, so that it is possible to widely illuminate the traveling road ahead of the vehicle within the range in which a glare is not to be caused to the driver of the oncoming vehicle.

(First Operational Effects)

As described above, the vehicle lamp 10 of the illustrative embodiment includes the light source for low beam (an example of the first light source) 14, the first array light source 16 and the second array light source 17, and the first array light source 16 and the second array light source 17 are arranged in the upper-lower direction. For this reason, it is possible to mount many light emitting elements to the lamp without increasing a width of the lamp in the left-right direction. Also, as compared to a lamp having one array light source, since it is possible to mount more light emitting elements, a degree of design freedom of the light distribution pattern that is to be added to the light distribution pattern for low beam PL is improved, for example.

Also, it is possible to illuminate the lights LA1, LA2 ahead of the lamp, which are to be emitted from the first array light source 16 and the second array light source 17, as clearer light distribution patterns, respectively, while suppressing the lamp from increasing in size.

Also, it is possible to use the light LA1 to be emitted from the first array light source 16, as light for strengthening the road surface illumination function.

Also, the light distribution pattern P1, which is to be formed by the respective semiconductor light emitting elements 51 of the first array light source 16, and the light distribution pattern P2, which is to be formed by the respective semiconductor light emitting elements 55 of the second array light source 17, are offset in the left-right direction of the lamp. For this reason, it is possible to increase the number of divisions in the light distribution patterns, which are configured by the first array light source 16 and the second array light source 17, and to improve the resolutions thereof, so that it is possible to form a variety of light distribution patterns, depending on utilities or situations.

Further, the light distribution pattern, which is to be formed by the light LA2 to be emitted from the second array light source 17, is configured to overlap with the additional light distribution pattern P1, which is to be formed by the light LA1 to be emitted from the first array light source 16, so that it is possible to effectively utilize a part of the light LA2 to be emitted from the second array light source 17, as the light distribution pattern for high beam.

Also, since the first array light source 16 is arranged between the first back focal point F1 of the projection lens 12 and the light source for low beam 14 in the front-rear direction of the lamp, it is possible to illuminate the light LA1 emitted from the first array light source 16 ahead of the lamp through the vicinity of the first back focal point F1 while suppressing the lamp from increasing in size in the front-rear direction In the meantime, if a part functioning as the shade configured to form the cutoff line CL of the light distribution pattern for low beam PL is formed at a tip end of the base member 19, the tip end has a predetermined thickness due to restraints of processing conditions of the base member 19. Since the tip end cannot reflect forward the light, it becomes a cause of a dark part.

In contrast, according to the illustrative embodiment, the optical member 18 separately provided from the base member 19 is provided with the shade part 68 configured to form the cutoff line CL of the light distribution pattern for low beam PL with being mounted to the base member 19. Since the optical member 18 having the shade part 68 is a component separate from the base member 19, it is possible to thinly form the tip end without being restrained to the processing conditions of the base member 19. For this reason, it is possible to reduce the thickness of the tip end becoming a cause of a dark part, so that it is possible to suppress the dark part to such a level that a driver cannot notice the same.

Also, since the optical member 18 has the first reflective surface 65 configured to reflect the light LA1 emitted from the first array light source 16 towards the first incident surface 31*a* of the projection lens 1 and the second reflective surface 66 configured to reflect the light LA2 emitted from the second array light source 17 towards the second incident surface 32*a* of the projection lens 12, it is possible to further effectively use the lights LA1, LA2 to be emitted from the first array light source 16 and the second array light source 17.

Also, the second surface 42 of the base member 19 is configured as the inclined surface inclined relative to the optical axis of the projection lens 12 so that the light output parts of the semiconductor light emitting elements 51 of the first array light source 16 arranged on the second surface 42 are to obliquely face in the front and upper direction and the light output parts of the semiconductor light emitting elements 51 of the first array light source 16 are to be located below the first back focal point F1. Therefore, it is possible to enable most of the light to be emitted from the first array light source 16 to pass by the first back focal point F1 while arranging the first array light source 16 at a position avoiding a light path for forming the light distribution pattern for low beam PL. For this reason, it is possible to effectively use the light LA1 of the first array light source 16.

Also, since the center position of the first array light source 16 is arranged at a position different from the center position of the second array light source 17 in the left-right direction of the lamp, the degree of design freedom of the light distribution patterns in the left-right direction of the lamp is improved, so that the road surface illumination function can be strengthened, for example.

Further, since the first array light source 16 and the second array light source 17 are aligned in the two stages in the upper-lower direction, it is possible to reduce a distance between the light emitting element and the back focal point of the projection lens as short as possible, as compared to a configuration where more light emitting elements are aligned in one stage in the left-right direction of the lamp, so that it is possible to increase the using efficiency of the light to be emitted from the light emitting elements.

In the meantime, it is possible to increase the resolutions of the light distribution patterns by increasing the numbers of the semiconductor light emitting elements 51 of the first array light source 16 and the semiconductor light emitting elements 55 of the second array light source 17 to be aligned in the left-right direction and the number of stages thereof in the upper-lower direction.

Also, in the illustrative embodiment, the light source for low beam 14 has been exemplified as the light source of the projector-type optical system. However, the present invention is not limited thereto. That is, it is sufficient that the light source is a light source of a projector-type optical system (a projection-type optical system using a reflector and a projection lens), and the light distribution patterns may be formed depending on the utilities. For example, a light source configured to form a light distribution pattern specified to the road surface illumination or a light source configured to form a light distribution pattern that is to be illuminated towards a specific target may be used.

(Second Operational Effects)

According to the vehicle lamp 10 of the illustrative embodiment, the output surface 30 of the projection lens 12 is formed to have a convex shape based on one circular arc, and the first array light source 16 (an example of the first light source) and the second array light source 17 (an example of the second light source) are arranged at the rear of the projection lens 12. Therefore, it is possible to keep an aesthetic quality of an outward appearance of the lamp, as seen from front. Also, since the first array light source 16 is arranged at the position corresponding to the first back focal point F1 and the second array light source 17 is arranged at the position corresponding to the second back focal point F2, it is possible to illuminate the lights LA1, LA2 ahead of the lamp, which are to be emitted from the first array light source 16 and the second array light source 17, as clear light distribution patterns, and to improve the degree of design freedom of the light distribution patterns.

In particular, since the first array light source 16 and the second array light source 17 are arranged in the upper-lower direction, it is possible to improve the degree of design freedom of the light distribution patterns in the upper-lower direction of the lamp while suppressing the lamp from increasing in size in the left-right direction.

Also, since the lamp has the first reflective surface 65 configured to reflect the light LA1 emitted from the first array light source 16 towards the first incident surface 31*a* of the projection lens 12 and the second reflective surface 66 configured to reflect the light LA2 emitted from the second array light source 17 towards the second incident surface 32*a* of the projection lens 12, it is possible to further effectively use the lights LA1, LA2 to be emitted from the first array light source 16 and the second array light source 17 and to illuminate the lights ahead of the lamp, as the clearer light distribution patterns.

Also, since the center position of the first array light source 16 is arranged at a position different from the center position of the second array light source 17 in the left-right direction of the lamp, the degree of design freedom of the light distribution patterns in the left-right direction of the lamp is improved, so that the road surface illumination function can be strengthened, for example.

Further, since the first array light source 16 and the second array light source 17 are aligned in the two stages in the upper-lower direction, it is possible to reduce a distance between the light emitting element and the back focal point of the projection lens as short as possible, as compared to a configuration where more light emitting elements are aligned in one row in the left-right direction of the lamp, so that it is possible to increase the using efficiency of the lights to be emitted from the light emitting elements.

In the meantime, it is possible to increase the resolutions of the light distribution patterns by increasing the numbers of the semiconductor light emitting elements 51 of the first array light source 16 and the semiconductor light emitting elements 55 of the second array light source 17 to be aligned in the left-right direction and the number of stages thereof in the upper-lower direction.

Figure 11:
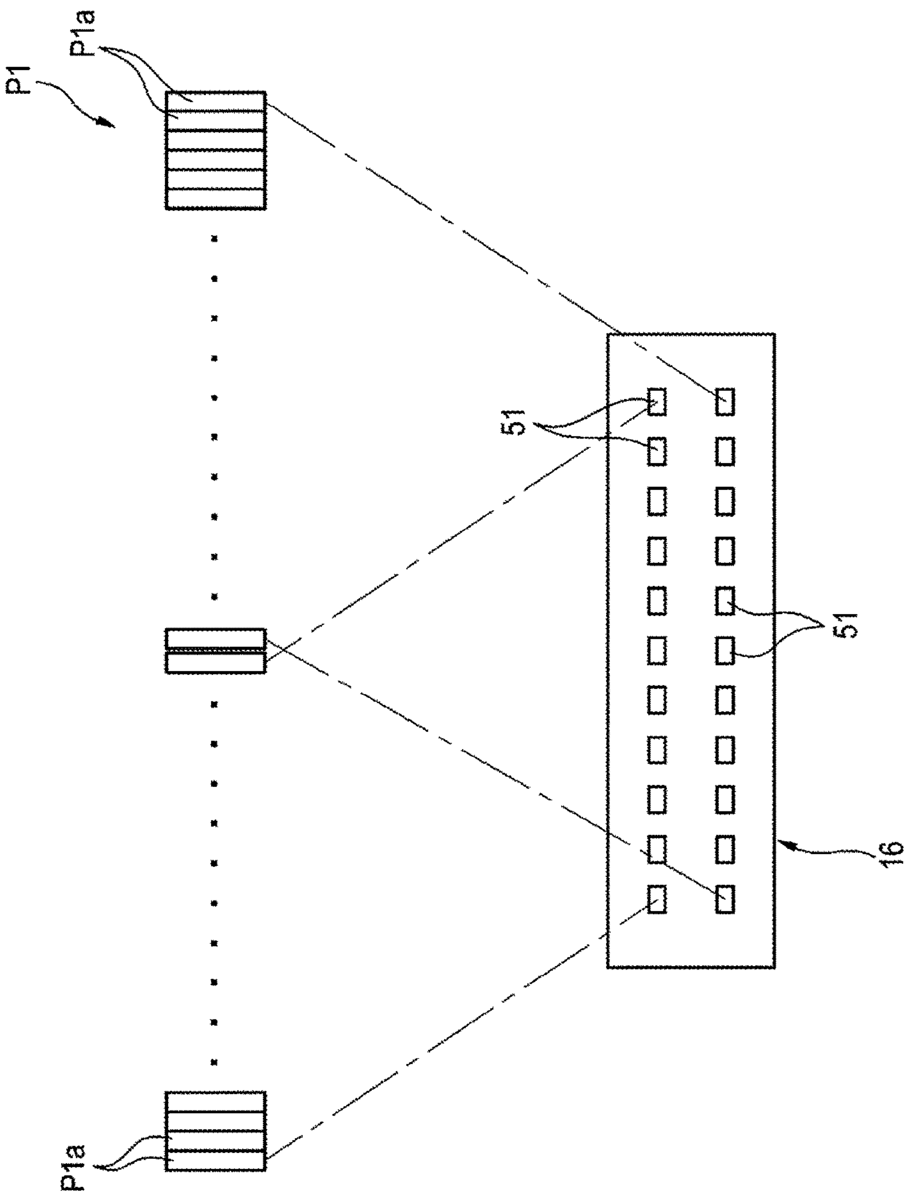
FIG. 11 is a schematic view illustrating a method of forming a light distribution pattern by an array light source having semiconductor light emitting elements arranged in two stages.

For example, as shown in FIG. 11, when the semiconductor light emitting elements 51 of the first array light source 16 are aligned in two stages and respective light distribution patterns P1*a* of the semiconductor light emitting elements 51 in each stage are arranged in one row, it is possible to widely illuminate the light distribution pattern P1, which is to be formed by the first array light source 16, in the left-right direction while suppressing a width size of the lamp, and to improve the resolution thereof. Similarly, when the semiconductor light emitting elements 55 of the second array light source 17 are aligned in two stages and respective light distribution patterns P2*a* of the semiconductor light emitting elements 55 in each stage are arranged in one row, it is possible to widely illuminate the light distribution pattern P2, which is to be formed by the second array light source 17, in the left-right direction while suppressing a width size of the lamp, and to improve the resolution thereof.

Also, in the illustrative embodiment, the light source for low beam 14 has been exemplified as the light source of the projector-type optical system. However, the present invention is not limited thereto. That is, it is sufficient that the light source is a light source of a projector-type optical system (a projection-type optical system using a reflector and a projection lens), and the light distribution patterns may be formed depending on the utilities. For example, a light source configured to form a light distribution pattern specified to the road surface illumination or a light source configured to form a light distribution pattern that is to be illuminated towards a specific target may be used.

(Third Operational Effects)

According to the vehicle lamp 10 of the illustrative embodiment, the light source for low beam 14 (an example of the first light source) is configured to emit the light L for forming the light distribution pattern for low beam PL, the first array light source 16 is configured to emit the light LA1 for forming the additional light distribution pattern for high beam P1, and the second array light source 17 is configured to emit the light LA2 for forming the additional light distribution pattern P2, which is to overlap with both the light distribution pattern for low beam PL and the additional light distribution pattern for high beam P1 on the vertical virtual screen ahead of the lamp. Thereby, it is possible to widen a width of the road surface to which the light to be emitted from the lamp is to be illuminated and to illuminate the light to a distant position by the light LA2 that is to be emitted from the second array light source 17 and to form the additional light distribution pattern P2, which is to overlap with both the light distribution pattern for low beam PL to be formed by the light L of the light source for low beam 14 and the additional light distribution pattern for high beam P1 to be formed by the light LA1 of the first array light source 16.

Also, the light distribution pattern P1, which is to be formed by the respective semiconductor light emitting elements 51 of the first array light source 16, and the light distribution pattern P2, which is to be formed by the respective semiconductor light emitting elements 55 of the second array light source 17, are offset in the left-right direction of the lamp. For this reason, it is possible to increase the number of divisions in the light distribution patterns, which are configured by the first array light source 16 and the second array light source 17, and to improve the resolutions thereof, so that it is possible to form a variety of light distribution patterns, depending on utilities or situations.

Further, since the center position of the first array light source 16 is arranged at the position different from the center position of the second array light source 17 in the left-right direction of the lamp, it is possible to widen a width of the road surface in the left-right direction of the lamp, to which the light is to be illuminated, and to increase the number of divisions of the light distribution patterns, which are configured by the first array light source 16 and the second array light source 17.

Also, since the respective arrangement pitches of the plurality of semiconductor light emitting elements 51 of the first array light source 16 in the left-right direction of the lamp are smaller towards the first back focal point F1 of the projection lens 12, it is possible to increase the using efficiency of the light to be emitted from the first array light source 16 while widening the width of the road surface to which the light emitted from the lamp is to be illuminated, so that the light can be illuminated to a distant position.

Further, since the first array light source 16 and the second array light source 17 are aligned in the two stages in the upper-lower direction, it is possible to reduce a distance between the light emitting element and the back focal point of the projection lens as short as possible, as compared to a configuration where more light emitting elements are aligned in one stage in the left-right direction of the lamp, so that it is possible to increase the using efficiency of the lights to be emitted from the light emitting elements.

In the meantime, it is possible to increase the resolutions of the light distribution patterns by increasing the numbers of the semiconductor light emitting elements 51 of the first array light source 16 and the semiconductor light emitting elements 55 of the second array light source 17 to be aligned in the left-right direction and the number of stages thereof in the upper-lower direction.

For example, as shown in FIG. 11, when the semiconductor light emitting elements 51 of the first array light source 16 are aligned in two stages and respective light distribution patterns P1*a* of the semiconductor light emitting elements 51 in each stage are arranged in one row, it is possible to widely illuminate the light distribution pattern P1, which is to be formed by the first array light source 16, in the left-right direction while suppressing a width size of the lamp, and to improve the resolution thereof. Similarly, when the semiconductor light emitting elements 55 of the second array light source 17 are aligned in two stages and respective light distribution patterns P2*a* of the semiconductor light emitting elements 55 in each stage are arranged in one row, it is possible to widely illuminate the light distribution pattern P2, which is to be formed by the second array light source 17, in the left-right direction while suppressing a width size of the lamp, and to improve the resolution thereof.

Also, the vehicle lamp 10 is not limited to the projector-type lamp and may be a parabola-type lamp configured to illuminate the light of the light source ahead of the vehicle by a reflector having a parabolic reflective surface, as seen from a section.

(Fourth Operational Effects) The vehicle lamp 10 of the illustrative embodiment includes the first array light source 16 and the second array light source 17, and the first array light source 16 and the second array light source 17 are arranged in the upper-lower direction. For this reason, it is possible to mount many semiconductor light emitting elements 51, 55 to the lamp without increasing the width of the lamp in the left-right direction. Also, the light distribution pattern P1, which is to be formed by the respective semiconductor light emitting elements 51 of the first array light source 16, and the light distribution pattern P2, which is to be formed by the respective semiconductor light emitting elements 55 of the second array light source 17, are offset in the left-right direction of the lamp. For this reason, it is possible to increase the number of divisions in the light distribution patterns, which are configured by the first array light source 16 and the second array light source 17, and to improve the resolutions thereof, so that it is possible to form a variety of light distribution patterns, depending on utilities or situations.

Also, the projection lens 12 has the first back focal point F1 and the second back focal point F2, the first array light source 16 is arranged at the position corresponding to the first back focal point F1, and the second array light source 17 is arranged at the position corresponding to the second back focal point F2. Therefore, it is possible to illuminate the lights LA1, LA2 ahead of the lamp, which are to be emitted from the first array light source 16 and the second array light source 17, as the clear light distribution patterns.

Also, the projection lens 12 has the first lens part 31 configured to form the first back focal point F1 and the second lens part 32 configured to form the second back focal point F2, and the first reflective surface 65 configured to reflect the light LA1 emitted from the first array light source 16 towards the incident surface 31*a* (an example of the incident surface) of the first lens part 31 and the second reflective surface 66 configured to reflect the light LA2 emitted from the second array light source 17 towards the incident surface 32*a* (an example of the incident surface) of the second lens part 32. Thereby, it is possible to illuminate the lights LA1, LA2 ahead of the lamp, which are to be emitted from the first array light source 16 and the second array light source 17, as the clearer light distribution patterns.

Further, the first reflective surface 65 and the second reflective surface 66 are provided at the optical member 18, which is a component separate from the base member, and the optical member 18 has the first opening 61 through which the first array light source 16 is exposed ahead of the lamp and the second opening 62 through which the second array light source 17 is exposed ahead of the lamp at the state where the optical member is mounted to the base member 19. Thereby, the optical member 18 is mounted to the base member 19, so that it is possible to illuminate the lights LA1, LA2 ahead of the lamp, which are to be emitted from the first array light source 16 and the second array light source 17, as the clearer light distribution patterns.

Also, since the light output parts of the respective semiconductor light emitting elements 51 of the first array light source 16 are arranged to face towards the direction different from the light output parts of the respective semiconductor light emitting elements 55 of the second array light source 17 in the upper-lower direction of the lamp, it is possible to easily form the light distribution patterns by using the respective array light sources, depending on the utilities or situations.

Also, since the center position of the first array light source 16 is arranged at the position different from the center position of the second array light source 17 in the left-right direction of the lamp, the degree of design freedom of the light distribution patterns in the left-right direction of the lamp is improved, so that the road surface illumination function can be strengthened, for example.

Further, since the first array light source 16 and the second array light source 17 are aligned in the two stages in the upper-lower direction, it is possible to reduce the distance between the light emitting element and the back focal point of the projection lens as short as possible, as compared to a configuration where more light emitting elements are aligned in one row in the left-right direction of the lamp, so that it is possible to increase the using efficiency of the light emitting elements.

In the meantime, it is possible to increase the resolutions of the light distribution patterns by increasing the numbers of the semiconductor light emitting elements 51 of the first array light source 16 and the semiconductor light emitting elements 55 of the second array light source 17 to be aligned in the left-right direction and the number of stages thereof in the upper-lower direction.

For example, as shown in FIG. 11, when the semiconductor light emitting elements 51 of the first array light source 16 are aligned in two stages and respective light distribution patterns P1*a* of the semiconductor light emitting elements 51 in each stage are arranged in one row, it is possible to widely illuminate the light distribution pattern P1, which is to be formed by the first array light source 16, in the left-right direction while suppressing a width size of the lamp, and to improve the resolution thereof. Similarly, when the semiconductor light emitting elements 55 of the second array light source 17 are aligned in two stages and respective light distribution patterns P2*a* of the semiconductor light emitting elements 55 in each stage are arranged in one row, it is possible to widely illuminate the light distribution pattern P2, which is to be formed by the second array light source 17, in the left-right direction while suppressing a width size of the lamp, and to improve the resolution thereof.

Also, in the illustrative embodiment, the light source for low beam 14 has been exemplified as the light source of the projector-type optical system. However, the present invention is not limited thereto. That is, it is sufficient that the light source is a light source of a projector-type optical system (a projection-type optical system using a reflector and a projection lens), and the light distribution patterns may be formed depending on the utilities. For example, a light source configured to form a light distribution pattern specified to the road surface illumination or a light source configured to form a light distribution pattern that is to be illuminated towards a specific target may be used.

Subsequently, modified embodiments of the vehicle lamp 10 of the illustrative embodiment are described.

First Modified Embodiment

Figure 12:
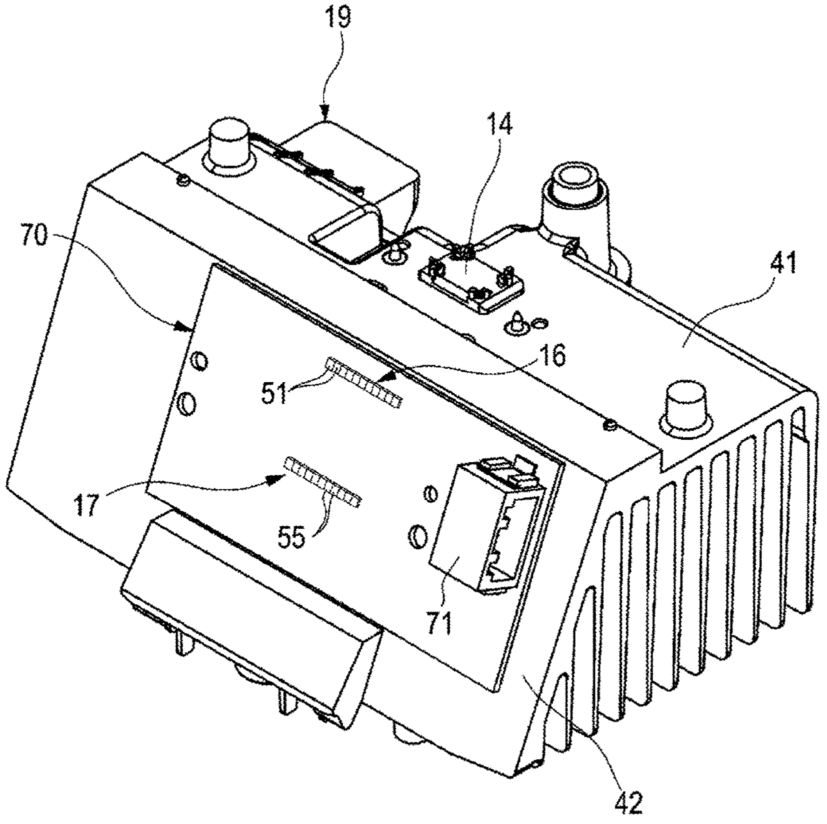
FIG. 12 is a perspective view of a base member having a light source mounted thereon, illustrating a first modified embodiment.

As shown in FIG. 12, in a first modified embodiment, one rigid circuit board 70 is provided. The rigid circuit board 70 is a glass epoxy circuit board or a paper phenol circuit board, for example. The rigid circuit board 70 is fixed and mounted to the second surface 42, which is the inclined surface of the base member 19. The rigid circuit board 70 is mounted thereon with the first array light source 16 and the second array light source 17 at an interval in the upper-lower direction. The rigid circuit board 70 is provided at one side part with a connector 71. The connector 71 is connected with a connector (not shown) of a power feeding line, and the power is fed from the power feeding line to the semiconductor light emitting elements 51 of the first array light source 16 and the semiconductor light emitting elements 55 of the second array light source 17.

According to the above configuration, it is possible to easily arrange the first array light source 16 and the second array light source 17 at predetermined positions of the base member 19. Also, it is possible to suppress the relative positional deviation between the first array light source 16 and the second array light source 17.

Second Modified Embodiment

Figure 13:
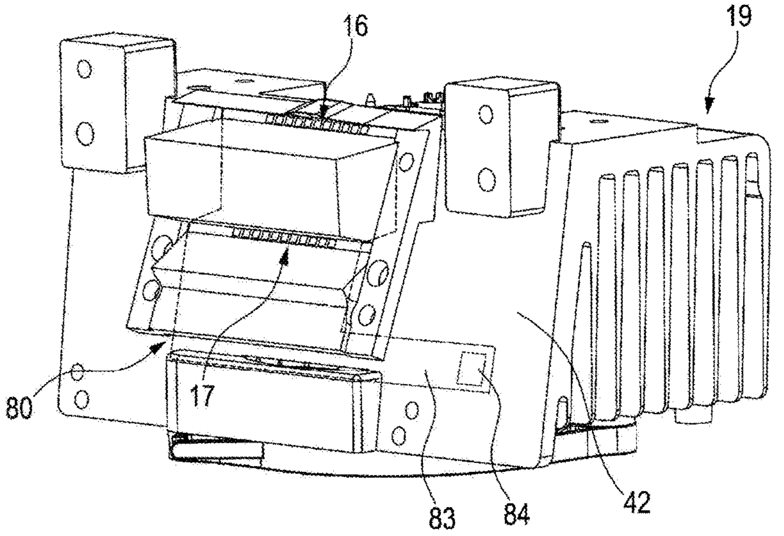
FIG. 13 is a perspective view of a base member having a light source mounted thereon, illustrating a second modified embodiment.
Figure 14:
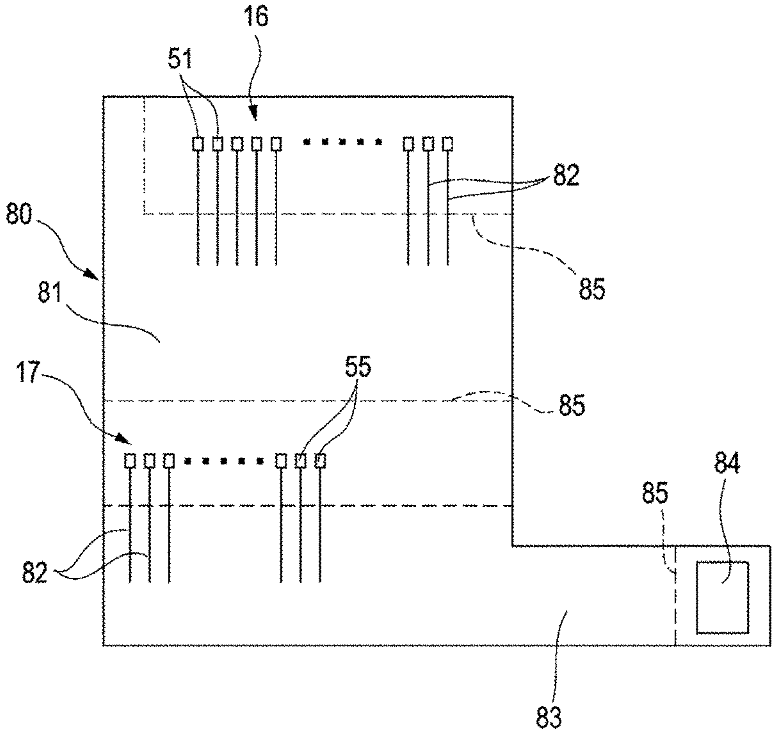
FIG. 14 is a schematic plan view of a flexible circuit board, illustrating the second modified embodiment.

As shown in FIGS. 13 and 14, in a second modified embodiment, one flexible circuit board 80 is provided. The flexible circuit board 80 is a circuit board of which a wiring pattern 82 made of a copper foil is formed on a highly flexible base 81 made of a plastic film such as polyimide. The flexible circuit board 80 is fixed and mounted to the second surface 42, which is the inclined surface of the base member 19. The flexible circuit board 80 is mounted thereon with the first array light source 16 and the second array light source 17 at an interval in the upper-lower direction. A pullout part 83 extends from one side part of the flexible circuit board 80, and the pullout part 83 is provided with a connector 84. The connector 84 is connected with a connector (not shown) of a power feeding line, and the power is fed from the power feeding line to the semiconductor light emitting elements 51 of the first array light source 16 and the semiconductor light emitting elements 55 of the second array light source 17.

The flexible circuit board 80 is mounted to the second surface 42 having an inclined surface of the base member 19, on which the semiconductor light emitting elements 51 of the first array light source 16 and the semiconductor light emitting elements 55 of the second array light source 17 are mounted at different angles. Thereby, at the state where the flexible circuit board 80 is mounted to the base member 19, the light output parts, which are the light emitting surfaces of the respective semiconductor light emitting elements 51 of the first array light source 16, are arranged to face towards a direction different from the light output parts, which are the light emitting surfaces of the respective semiconductor light emitting elements 55 of the second array light source 17, in the upper-lower direction of the lamp.

In the meantime, preferably, the flexible circuit board 80 is provided with reinforcement plates 85 made of a metal plate such as aluminum at mounting parts of the semiconductor light emitting elements 51 of the first array light source 16, the semiconductor light emitting elements 55 of the second array light source 17 and the connector 84 so as to improve the rigidness of the mounting parts of the components. By doing so, it is possible to easily fix the first array light source 16, the second array light source 17 and the connector 84 to the base member 19. Also, when fixing the flexible circuit board 80 to the base member 19, a thermal conductive adhesive, an aluminum plate or the like may be interposed between the flexible circuit board 80 and the base member 19. Thereby, it is possible to favorably transmit heats, which are to be generated from the first array light source 16 and the second array light source 17, to the base member 19. Also, the first array light source 16 and the second array light source 17 may be configured by directly mounting the semiconductor light emitting elements 51, 55 to the flexible circuit board 80 or may be configured by mounting a circuit board having the semiconductor light emitting elements 51, 55 mounted thereon to the flexible circuit board 80.

According to the above configuration, since the flexible circuit board 80 can be arranged with being bent, the operability is improved when mounting the first array light source 16 and the second array light source 17 to the base member 19. Also, the flexible circuit board 80 is used, so that the restraints are reduced when arranging the first array light source 16 and the second array light source 17 at predetermined postures. Therefore, the degree of design freedom of the light distribution patterns, which are configured by the first array light source 16 and the second array light source 17, is improved. Further, the flexible circuit board 80 is used, so that it is possible to easily provide the pullout part 83. Also, for example, it is possible to arrange the connector 84 at a position at which it does not interfere with the constitutional components of the lamp, such as the lens holder 13, a positioning pin and the like, so that the degree of design freedom is improved.

Third Modified Embodiment

Figure 15:
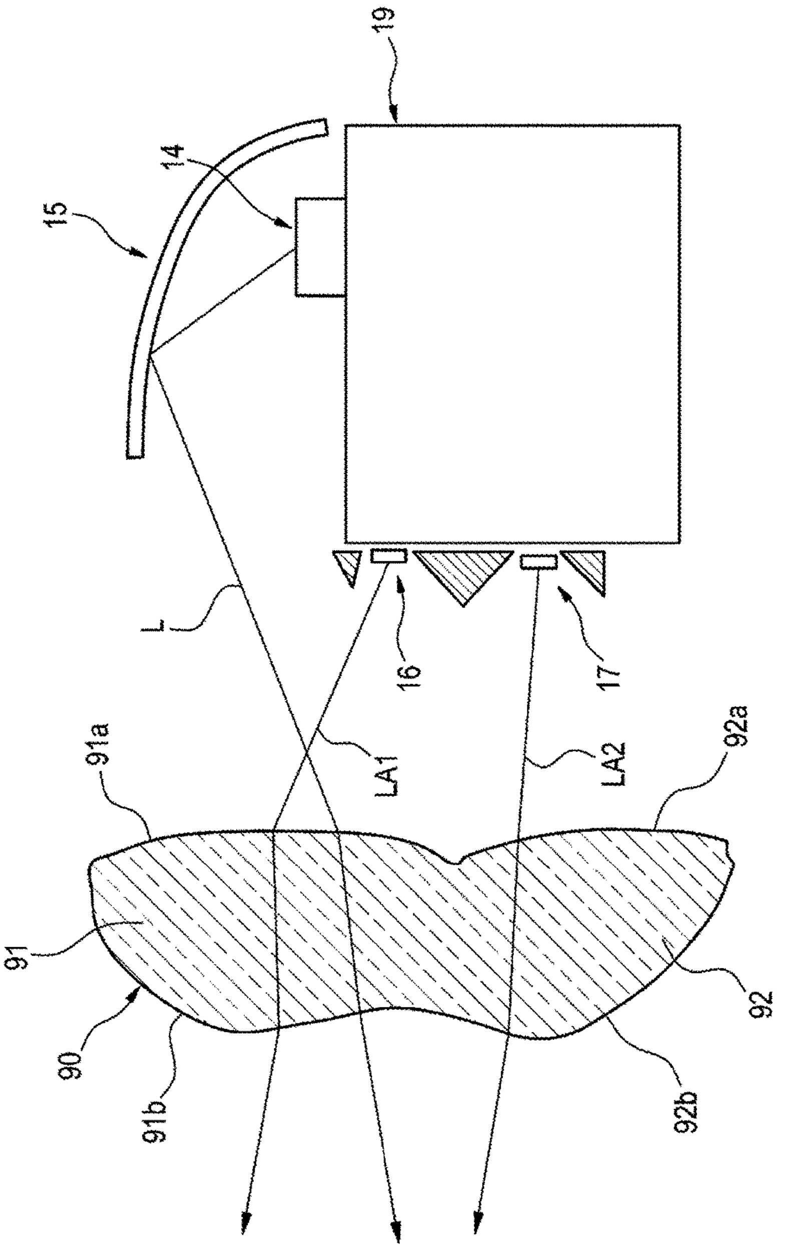
FIG. 15 is a schematic sectional view of the vehicle lamp, illustrating a third modified embodiment.

As shown in FIG. 15, in a third modified embodiment, the lamp has a projection lens 90 of which a convex output surface is divided in the upper-lower direction. Specifically, the projection lens 90 has a first lens part 91 at an upper side and a second lens part 92 at a lower side, and the first lens part 91 and the second lens part 92 are integrally configured. The first lens part 91 has a first incident surface 91*a* and a first output surface 91*b*, and the second lens part 92 has a second incident surface 92*a* and a second output surface 92*b*.

In the third modified embodiment, the light L from the light source for low beam 14 and the light LA1 from the first array light source 16 are incident on the first incident surface 91*a* of the first lens part 91 and are emitted from the first output surface 91*b*. Also, the light LA2 from the second array light source 17 is incident on the second incident surface 92*a* of the second lens part 92 and is emitted from the second output surface 92*b*.

According to the above structure, it is possible to extend forward the light distribution patterns and to enlarge the same in the left-right direction while saving the cost.

Fourth Modified Embodiment

Figure 16:
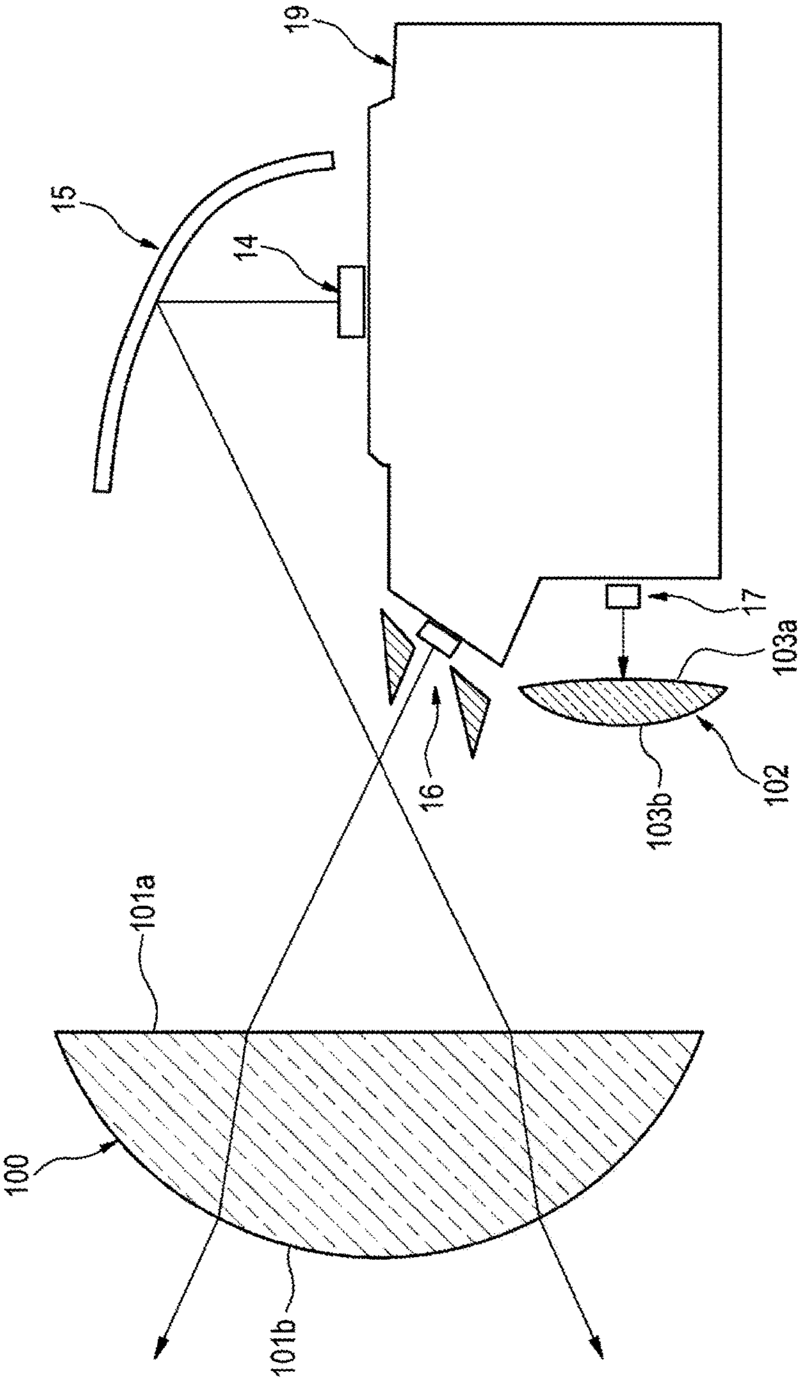
FIG. 16 is a schematic sectional view of the vehicle lamp, illustrating a fourth modified embodiment.

As shown in FIG. 16, in a fourth modified embodiment, the lamp has a projection lens 100 and a sub-lens 102. The projection lens 100 and the sub-lens 102 are unifocal lenses, respectively. The projection lens 100 has an incident surface 101*a* and an output surface 101*b*. Also, the sub-lens 102 has an incident surface 103*a* and an output surface 103*b*. The sub-lens 102 is arranged between the second array light source 17 and the projection lens 100.

In the fourth modified embodiment, the light L from the light source for low beam 14 and the light LA1 from the first array light source 16 are incident on the incident surface 101*a* of the projection lens 100 and are emitted from the output surface 101*b*. Also, the light LA2 from the second array light source 17 is incident on the incident surface 103*a* of the sub-lens 102, is emitted from the output surface 103*b*, is incident on the incident surface 101*a* of the projection lens 100 and is then emitted from the output surface 101*b*.

According to the above structure, since the projection lens 100, which is seen from front, is the unifocal lens, it is possible to guide the light LA2 from the second array light source 17 in a predetermined direction by the sub-lens 102, to extend forward the light distribution patterns and to enlarge the same in the left-right direction while improving the appearance of the lamp, as seen from front.

Fifth Modified Embodiment

Figure 17:
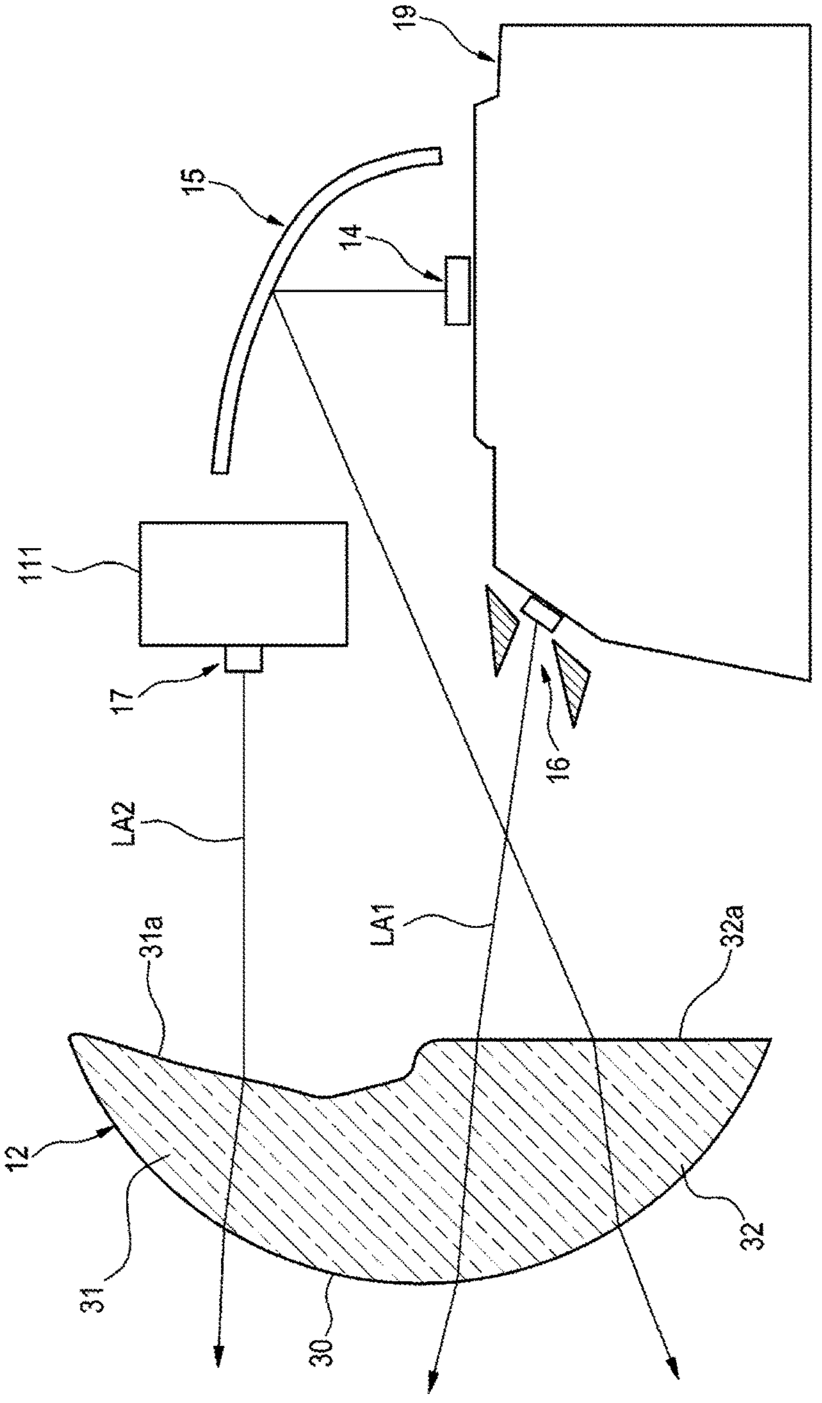
FIG. 17 is a schematic sectional view of the vehicle lamp, illustrating a fifth modified embodiment.

As shown in FIG. 17, in a fifth modified embodiment, the second array light source 17 is supported to not the base member 19 but a bracket 111 arranged at a position different from the base member 19, and is arranged above the first array light source 16.

In the fifth modified embodiment, the light L from the light source for low beam 14 and the light LA1 from the first array light source 16 are incident on the second incident surface 32*a* of the projection lens 12 and are emitted from the output surface 30. Also, the light LA2 from the second array light source 17 is incident on the first incident surface 31*a* of the projection lens 12 and is emitted from the output surface 30.

According to the above structure, it is possible to extend and enlarge the light distribution patterns while improving the appearance of the lamp, as seen from front.

Sixth Modified Embodiment

Figure 18:
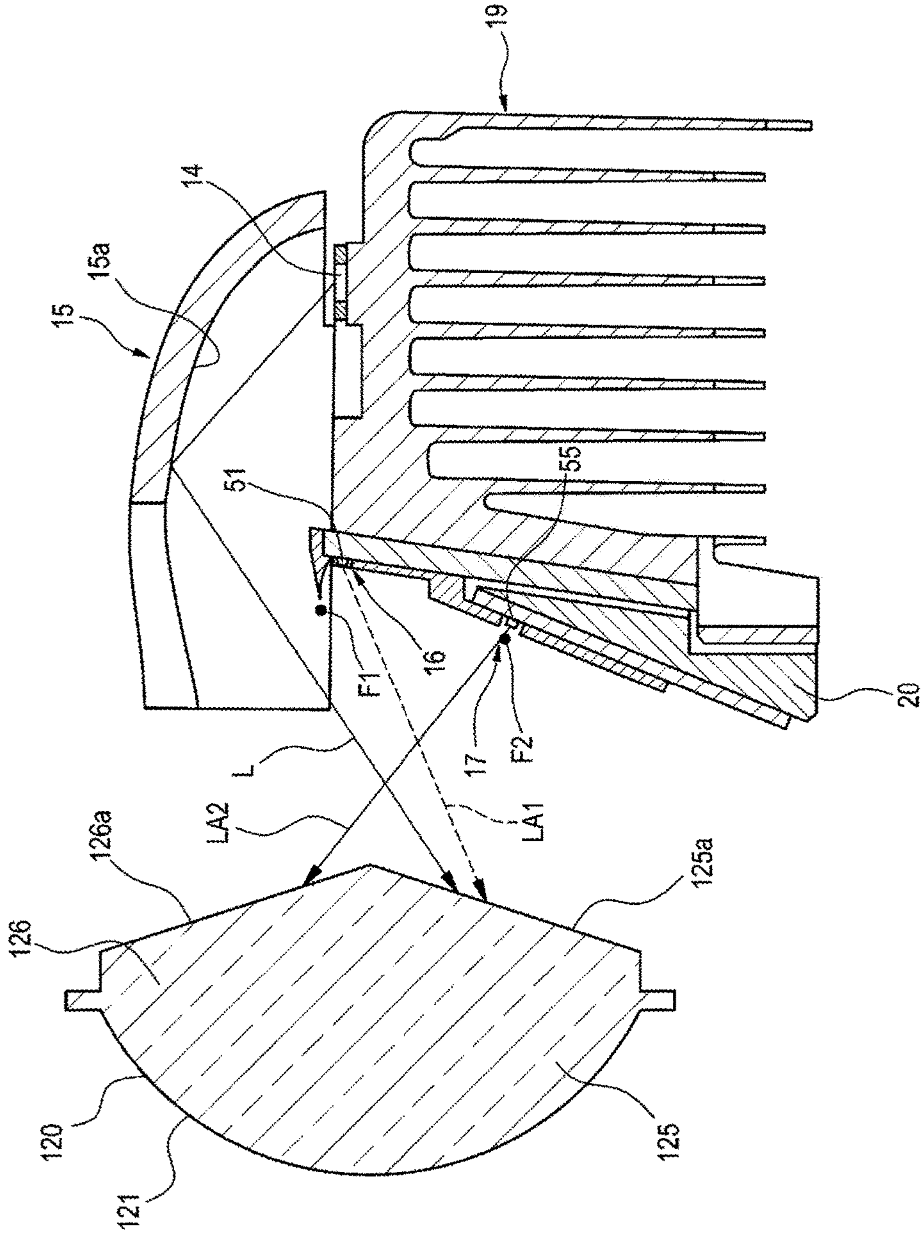
FIG. 18 is a schematic sectional view of the vehicle lamp, illustrating a sixth modified embodiment.

As shown in FIG. 18, a lamp of a sixth modified embodiment includes a projection lens 120, which is circular as seen from the front of the lamp and has an output surface 121 having a convex shape based on a single circular arc on a front surface. The projection lens 120 has a first lens part 125 configured to form a first back focal point F1 and a second lens part 126 configured to form a second back focal point F2. The projection lens 120 is configured so that the first lens part 125 is formed below the second lens part 126 and the first back focal point F1 is arranged above the second back focal point F2. That is, the projection lens 120 is a multifocal lens having the two back focal points F1, F2.

The light L emitted from the light source for low beam 14 is reflected on the reflective surface 15*a* of the reflector 15 and is then incident on the first incident surface 125*a* of the first lens part 125. The first array light source 16 is configured to emit the light LA1 towards a first incident surface 125*a* of the first lens part 125, and the second array light source 17 is configured to emit the light LA2 towards a second incident surface 126*a* of the second lens part 126. Thereby, the lights L, LA1 from the light source for low beam 14 and the first array light source 16 and the light LA2 of the second array light source 17 intersect each other in the upper-lower direction. In the meantime, the present invention is not limited to the configuration where the first array light source 16 directly emits the light LA1 towards the first incident surface 125*a* of the first lens part 125. For example, the first array light source 16 may be configured to indirectly emit the light LA1 towards the first incident surface 125*a* of the first lens part 125 by using an optical member such as a reflector, a lens or the like. Similarly, the present invention is not limited to the configuration where the second array light source 17 directly emits the light LA2 towards the second incident surface 126*a* of the second lens part 126. For example, the second array light source 17 may be configured to indirectly emit the light LA2 towards the second incident surface 126*a* of the second lens part 126 by using an optical member such as a reflector, a lens or the like.

Figure 19:
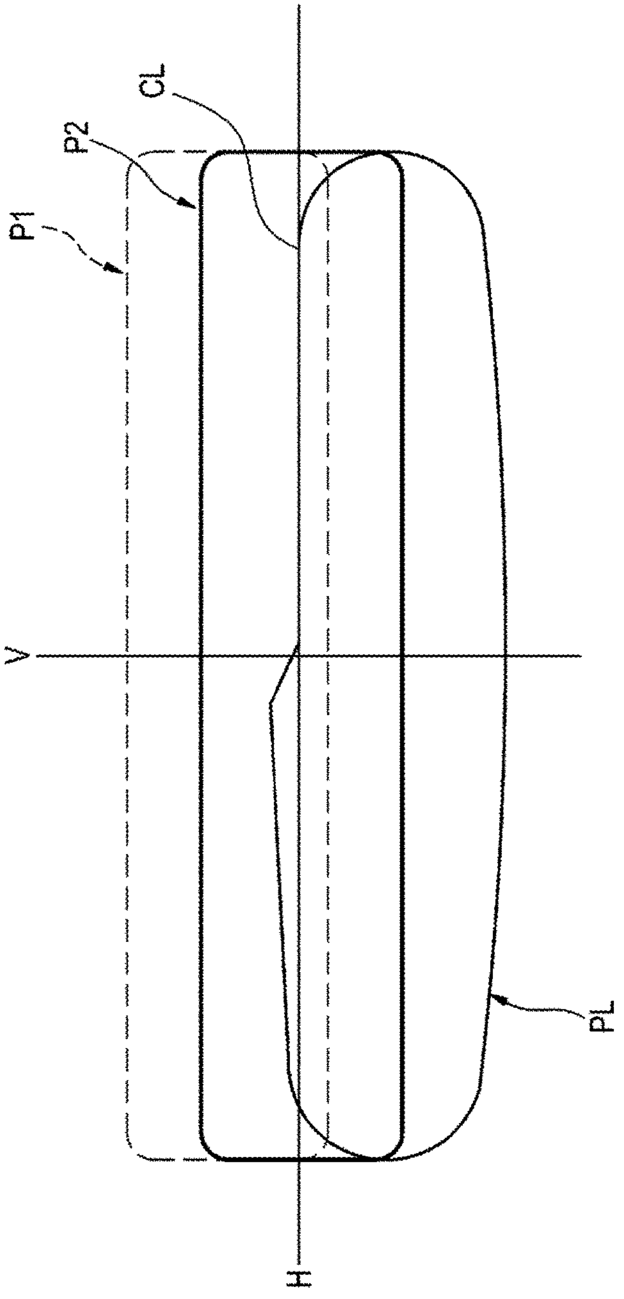
FIG. 19 is a schematic view depicting a light distribution pattern, which is to be formed on the vertical virtual screen arranged ahead of the lamp by light to be illuminated from the vehicle lamp of the sixth modified embodiment, in a projective manner.

FIG. 19 depicts a light distribution pattern projected on a virtual screen provided in the vertical direction at 25*m* ahead of the lamp. As shown in FIG. 19, the light L emitted from the light source for low beam 14 and incident on the first incident surface 125*a* of the projection lens 120 is emitted from the output surface 121 and forms a light distribution pattern for low beam PL having a cutoff line CL.

The light LA1 emitted from the first array light source 16 and incident on the first incident surface 125*a* of the projection lens 120 is emitted from the output surface 121 and forms an additional light distribution pattern P1. Also, the light LA2 emitted from the second array light source 17 and incident on the second incident surface 126*a* of the projection lens 120 is emitted from the output surface 121 and forms an additional light distribution pattern P2.

The additional light distribution pattern P2 formed by the light LA2 from the second array light source 17 overlaps with both the light distribution pattern for low beam PL formed by the light L from the light source for low beam 14 and the additional light distribution pattern for high beam P1 formed by the light LA1 from the first array light source 16, on the vertical virtual screen ahead of the lamp.

According to the above configuration, after the light LA1 to be emitted from the first array light source 16 towards the first incident surface 125*a* of the projection lens 120 and the light LA2 to be emitted from the second array light source 17 towards the second incident surface 126*a* of the projection lens 120 are enabled to intersect with each other in the upper-lower direction, the lights are illuminated ahead of the lamp from the projection lens 120, so that the degree of design freedom of the light distribution patterns is improved.

Seventh Modified Embodiment

Figure 20:
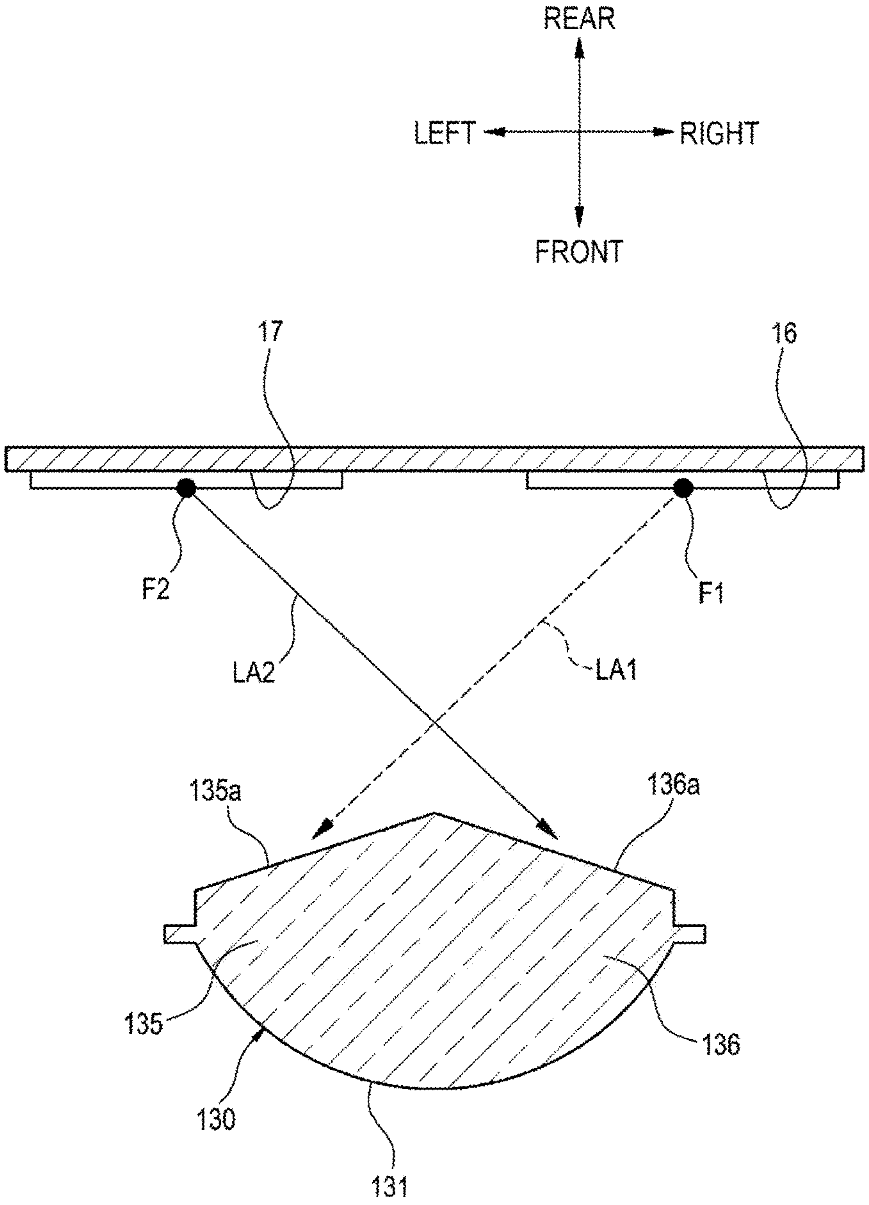
FIG. 20 is a view schematically depicting arrangement of an array light source and a projection lens, illustrating a seventh modified embodiment.

As shown in FIG. 20, in a seventh modified embodiment, the first array light source 16 and the second array light source 17 are arranged at left and right sides. Specifically, the first array light source 16 is arranged at the right side and the second array light source 17 is arranged at the left side, as seen from the front of the lamp. Also, in the seventh modified embodiment, the lamp includes a projection lens 130, which is circular as seen from the front of the lamp and has an output surface 131 having a convex shape based on a single circular arc on a front surface. The projection lens 130 has a first lens part 135 configured to form a first back focal point F1 and a second lens part 136 configured to form a second back focal point F2. The first lens part 135 is formed at the left side relative to the second lens part 136, as seen from the front of the lamp, and the first back focal point F1 is arranged at the right side relative to the second back focal point F2, as seen from the front of the lamp. That is, the projection lens 130 is a multifocal lens having the two back focal points F1, F2.

The first array light source 16 is configured to emit the light LA1 towards a first incident surface 135*a* of the first lens part 135, and the second array light source 17 is configured to emit the light LA2 towards a second incident surface 136*a* of the second lens part 136. Thereby, the lights L, LA1 from the light source for low beam 14 and the first array light source 16 and the light LA2 from the second array light source 17 intersect each other in the left-right direction. In the meantime, the present invention is not limited to the configuration where the first array light source 16 directly emits the light LA1 towards the first incident surface 135*a* of the first lens part 135. For example, the first array light source 16 may be configured to indirectly emit the light LA1 towards the first incident surface 135*a* of the first lens part 135 by using an optical member such as a reflector, a lens or the like. Similarly, the present invention is not limited to the configuration where the second array light source 17 directly emits the light LA2 towards the second incident surface 136*a* of the second lens part 136. For example, the second array light source 17 may be configured to indirectly emit the light LA2 towards the second incident surface 136*a* of the second lens part 136 by using an optical member such as a reflector, a lens or the like.

The light LA1 emitted from the first array light source 16 and incident on the first incident surface 135*a* of the projection lens 130 is emitted from the output surface 131 and forms an additional light distribution pattern P1. Also, the light LA2 emitted from the second array light source 17 and incident on the second incident surface 136*a* of the projection lens 130 is emitted from the output surface 131 and forms an additional light distribution pattern P2.

According to the above configuration, it is possible to improve the degree of design freedom of the light distribution patterns in the left-right direction of the lamp while suppressing the lamp from increasing in size in the upper-lower direction.

Further, after the light LA1 to be emitted from the first array light source 16 towards the first incident surface 135*a* of the projection lens 130 and the light LA2 to be emitted from the second array light source 17 towards the second incident surface 136*a* of the projection lens 120 are enabled to intersect with each other in the left-right direction, the lights are illuminated ahead of the lamp from the projection lens 130, so that the degree of design freedom of the light distribution patterns is further improved.

In the meantime, the light LA1 to be emitted from the first array light source 16 and the light LA2 to be emitted from the second array light source 17 are not necessarily required to intersect each other in the left-right direction. For example, the lights LA1, LA2 to be emitted from the first array light source 16 and the second array light source 17 may be respectively incident on the first incident surface 135*a* and the second incident surface 136*a* of the projection lens 130 without enabling the same to intersect each other in the left-right direction by using the projection lens 130 of which the first lens part 135 is formed at the right side relative to the second lens part 136, as seen from the front of the lamp, and the first back focal point F1 is arranged at the right side relative to the second back focal point F2, as seen from the front of the lamp.

Eighth Modified Embodiment

Figure 21:
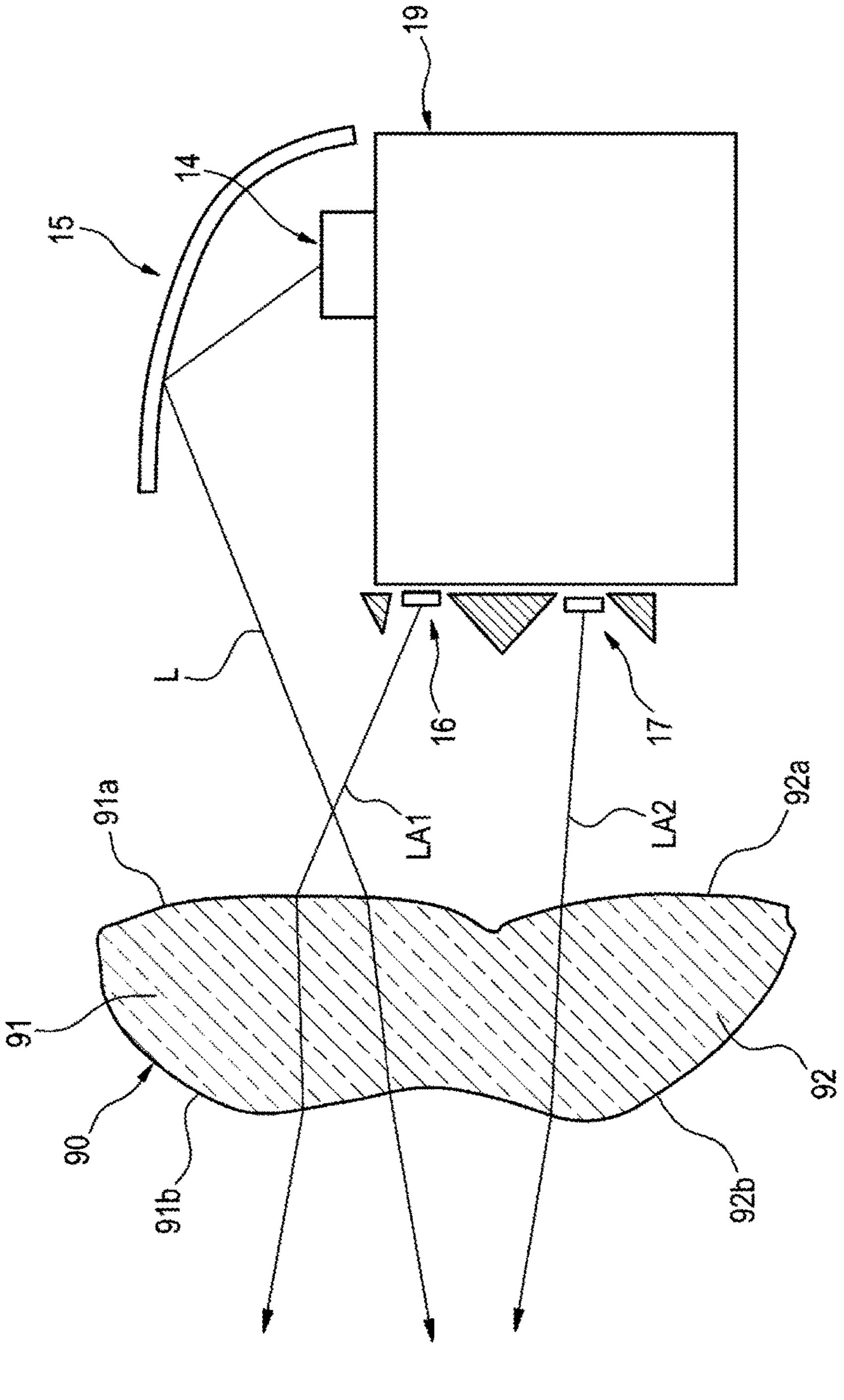
FIG. 21 is a schematic sectional view of the vehicle lamp, illustrating an eighth modified embodiment.

As shown in FIG. 21, a lamp of an eighth modified embodiment has a projection lens 90 of which a convex output surface is divided in the upper-lower direction. Specifically, the projection lens 90 has a first lens part 91 at an upper side and a second lens part 92 at a lower side, and the first lens part 91 and the second lens part 92 are integrally configured. The first lens part 91 has a first incident surface 91*a* and a first output surface 91*b*, and the second lens part 92 has a second incident surface 92*a* and a second output surface 92*b*.

According to the lamp of the eighth modified embodiment, the light L from the light source for low beam 14 and the light LA1 from the first array light source 16 are incident on the first incident surface 91*a* of the first lens part 91 and is emitted from the first output surface 91*b*. Also, the light LA2 from the second array light source 17 is incident on the second incident surface 92*a* of the second lens part 92 and is emitted from the second output surface 92*b*.

According to the above structure, it is possible to extend forward the light distribution patterns and to enlarge the same in the left-right direction while saving the cost.

Also, according to the above configuration, the light distribution pattern for low beam PL is formed by the light source for low beam 14, the additional light distribution pattern for high beam P1 is formed by the first array light source 16, and the additional light distribution pattern P2, which is to overlap with both the light distribution pattern for low beam PL and the additional light distribution pattern for high beam P1, is formed by the second array light source 17. Thereby, for example, it is possible to widen a width of the road surface to which the light to be emitted from the lamp is to be illuminated and to illuminate the light to a distant position.

Ninth Modified Embodiment

Figure 22:
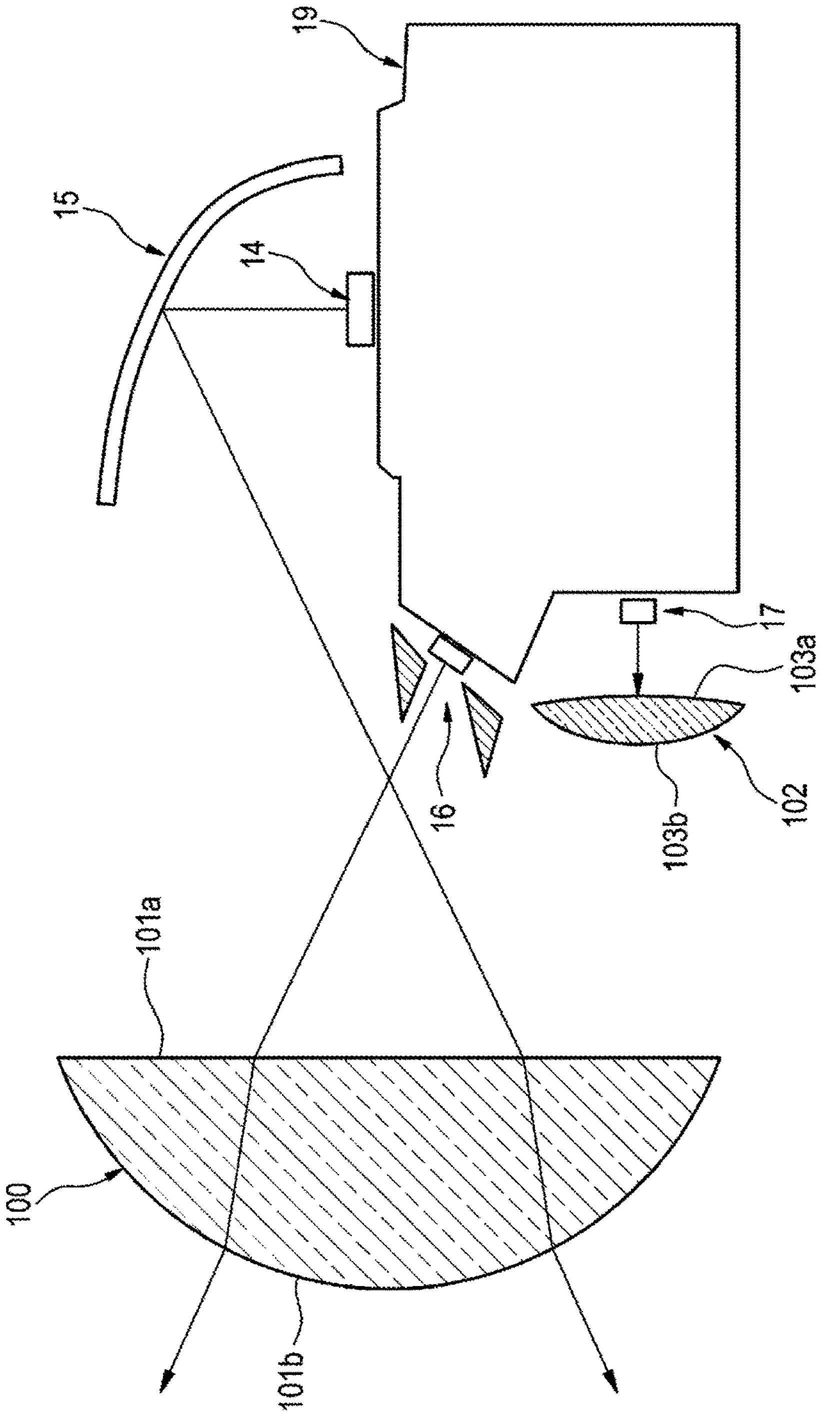
FIG. 22 is a schematic sectional view of the vehicle lamp, illustrating a ninth modified embodiment.

As shown in FIG. 22, a lamp of a ninth modified embodiment has a projection lens 100 and a sub-lens 102. The projection lens 100 and the sub-lens 102 are unifocal lenses, respectively. The projection lens 100 has an incident surface 101*a* and an output surface 101*b*. Also, the sub-lens 102 has an incident surface 103*a* and an output surface 103*b*. The sub-lens 102 is arranged between the second array light source 17 and the projection lens 100.

In the lamp of the ninth modified embodiment, the light L from the light source for low beam 14 and the light LA1 from the first array light source 16 are incident on the incident surface 101*a* of the projection lens 100 and are emitted from the output surface 101*b*. Also, the light LA2 from the second array light source 17 is incident on the incident surface 103*a* of the sub-lens 102, is emitted from the output surface 103*b*, is incident on the incident surface 101*a* of the projection lens 100 and is then emitted from the output surface 101*b*.

According to the above structure, since the projection lens 100, which is seen from front, is the unifocal lens, it is possible to guide the light LA2 from the second array light source 17 in a predetermined direction by the sub-lens 102, to extend forward the light distribution patterns and to enlarge the same in the left-right direction while improving the appearance of the lamp, as seen from front.

Also, according to the above configuration, the light distribution pattern for low beam PL is formed by the light source for low beam 14, the additional light distribution pattern for high beam P1 is formed by the first array light source 16, and the additional light distribution pattern P2, which is to overlap with both the light distribution pattern for low beam PL and the additional light distribution pattern for high beam P1, is formed by the second array light source 17. Thereby, for example, it is possible to widen a width of the road surface to which the light to be emitted from the lamp is to be illuminated and to illuminate the light to a distant position.

Tenth Modified Embodiment

Figure 23:
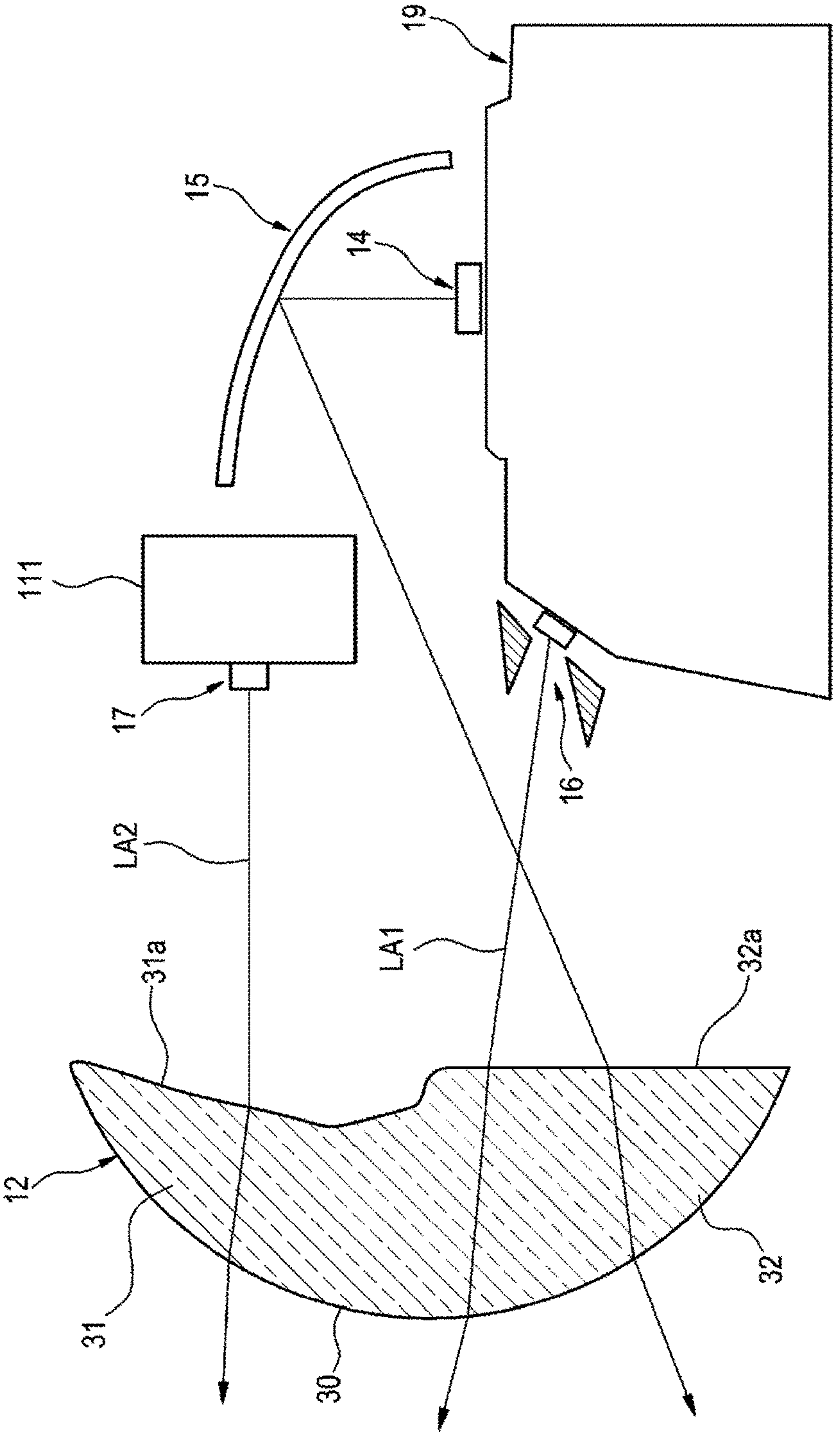
FIG. 23 is a schematic sectional view of the vehicle lamp, illustrating a tenth modified embodiment.

As shown in FIG. 23, in a lamp of a tenth modified embodiment, the second array light source 17 is supported to not the base member 19 but the bracket 111 arranged at a position different from the base member 19, and is arranged above the first array light source 16.

In the lamp of the tenth modified embodiment, the light L from the light source for low beam 14 and the light LA1 from the first array light source 16 are incident on the second incident surface 32*a* of the projection lens 12 and are emitted from the output surface 30. Also, the light LA2 from the second array light source 17 is incident on the first incident surface 31*a* of the projection lens 12 and is emitted from the output surface 30.

According to the above structure, it is possible to extend and enlarge the light distribution patterns while improving the appearance of the lamp, as seen from front.

Also, according to the above configuration, the light distribution pattern for low beam PL is formed by the light source for low beam 14, the additional light distribution pattern for high beam P1 is formed by the first array light source 16, and the additional light distribution pattern P2, which is to overlap with both the light distribution pattern for low beam PL and the additional light distribution pattern for high beam P1, is formed by the second array light source 17. Thereby, for example, it is possible to widen a width of the road surface to which the light to be emitted from the lamp is to be illuminated and to illuminate the light to a distant position.

Eleventh Modified Embodiment

Figure 24:
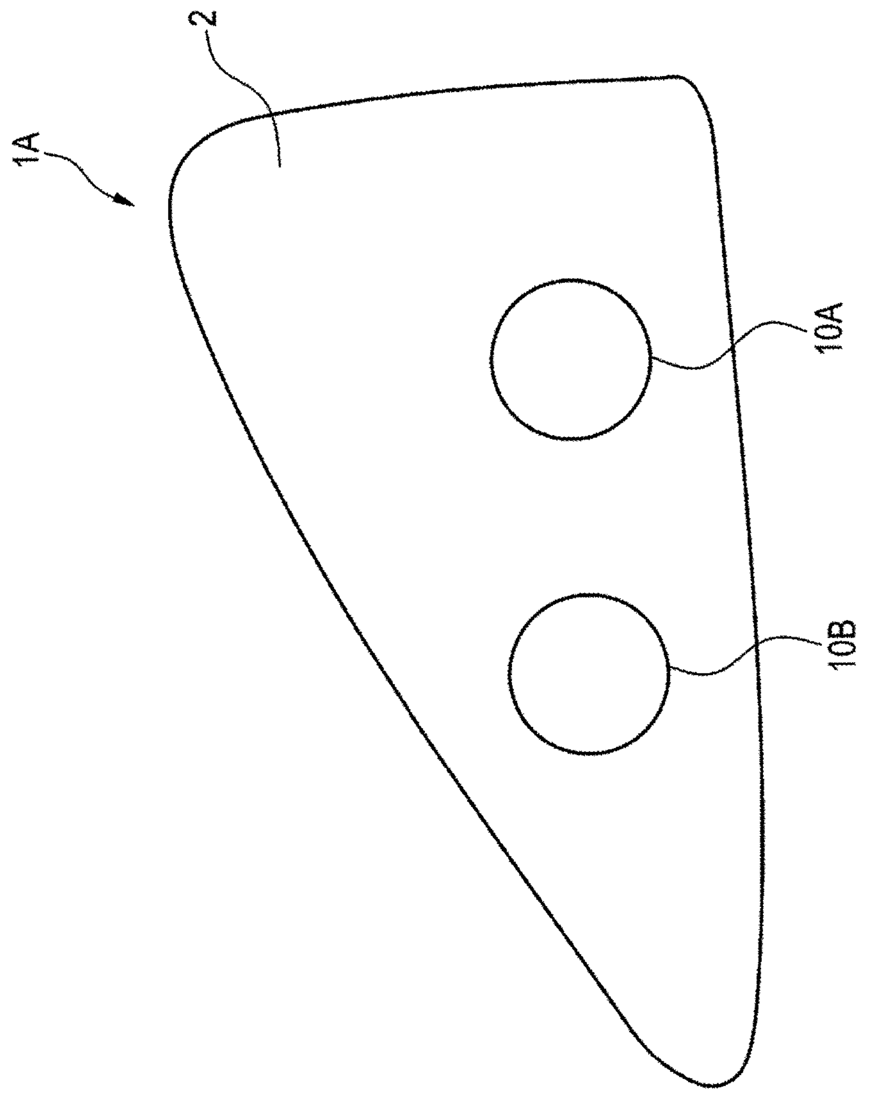
FIG. 24 is a schematic view of a headlight, as seen from front, illustrating an eleventh modified embodiment.

As shown in FIG. 24, according to a lamp of an eleventh modified embodiment, a headlight 1A is a multi-eye headlight having two vehicle lamps 10A, 10B. For example, one vehicle lamp 10A is a lamp for low beam having the light source for low beam 14 and the other vehicle lamp 10B is a lamp for high beam having the first array light source 16 and the second array light source 17. The vehicle lamp 10A is configured to emit the light L of the light source for low beam 14 for forming the light distribution pattern for low beam PL. Also, the vehicle lamp 10B is configured to emit the light LA1 of the first array light source 16 for forming the additional light distribution pattern for high beam P1 and to emit the light LA2 of the second array light source 17 for forming the additional light distribution pattern P2, which is to overlap with both the light distribution pattern for low beam PL and the additional light distribution pattern P1 on the vertical virtual screen ahead of the lamp.

According to the above structure, it is possible to widen a width of the road surface to which the light to be emitted from the lamp is to be illuminated and to illuminate the light to a distant position by the light LA2 from the second array light source 17 for forming the additional light distribution pattern P2, which is to overlap with both the light distribution pattern for low beam PL to be formed by the light L of the light source for low beam 14 and the additional light distribution pattern P1 to be formed by the light LA1 of the first array light source 16. Also, since each of the vehicle lamps 10A, 10B has less light sources, it is possible to simplify the structure.

Also, according to the above configuration, the light distribution pattern for low beam PL is formed by the light source for low beam 14, the additional light distribution pattern for high beam P1 is formed by the first array light source 16, and the additional light distribution pattern P2, which is to overlap with both the light distribution pattern for low beam PL and the additional light distribution pattern for high beam P1, is formed by the second array light source 17. Thereby, for example, it is possible to widen a width of the road surface to which the light to be emitted from the lamp is to be illuminated and to illuminate the light to a distant position.

Twelfth Modified Embodiment

Figure 25:
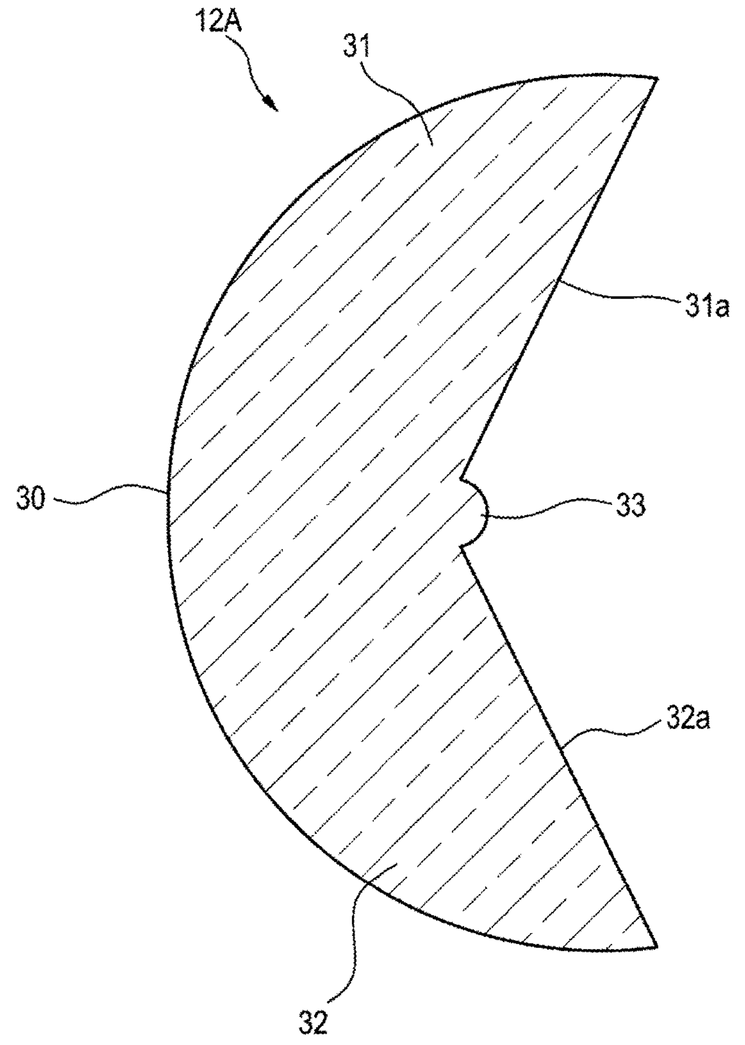
FIG. 25 is a schematic sectional view of a projection lens, illustrating a twelfth modified embodiment.

As shown in FIG. 25, in a lamp of a twelfth modified embodiment, a projection lens 12A is formed integrally with a convex portion 33. The convex portion 33 is formed at a boundary part between the first incident surface 31*a* of the first lens part 31 configured to form the first back focal point F1 and the second incident surface 32*a* of the second lens part 32 configured to form the second back focal point F2. The convex portion 33 protrudes towards the rear of the lamp and is formed in the width direction, which is the left-right direction of the projection lens 12.

According to the above configuration, since the focal areas to be formed by the convex portion 33 are dispersed, when the lights L, LA1, LA2 from the light source for low beam 14, the first array light source 16 and the second array light source 17 pass through the convex portion 33, the lights that are to pass through the convex portion 33 and to be illuminated ahead of the lamp diffuse, so that a boundary between an illumination area and a non-illumination area to be formed ahead of the lamp can be made blurry.

In the meantime, the present invention is not limited to the illustrative embodiments and can be appropriately modified and improved.

In addition, the materials, shapes, sizes, numerical values, forms, the number, arrangement places and the like of the respective constitutional elements of the illustrative embodiments are arbitrary inasmuch as the present invention can be implemented, and are not particularly limited.

What is claimed is:

1. A vehicle lamp comprising:

a projection lens;

a first light source arranged at a rear of the projection lens and configured to emit light for forming a predetermined light distribution pattern;

a reflector configured to reflect the light emitted from the first light source towards the projection lens;

a first array light source arranged at the rear of the projection lens and including a plurality of semiconductor light emitting elements aligned in at least one row extending in a left-right direction of the vehicle lamp; and a second array light source arranged at the rear of the projection lens and including a plurality of semiconductor light emitting elements aligned in at least one row extending in the left-right direction of the vehicle lamp, wherein the first array light source and the second array light source are arranged in an upper-lower direction of the vehicle lamp.

2. The vehicle lamp according to claim 1, wherein the projection lens has a first back focal point and a second back focal point, wherein the first array light source is arranged at a position corresponding to the first back focal point, and wherein the second array light source is arranged at a position corresponding to the second back focal point.

3. The vehicle lamp according to claim 1, wherein the plurality of semiconductor light emitting elements of the first array light source are configured to be individually lit on and off, wherein the plurality of semiconductor light emitting elements of the second array light source are configured to be individually lit on and off, and wherein in light distribution patterns to be projected on a vertical virtual screen ahead of the lamp, a light distribution pattern which is to be formed by the respective semiconductor light emitting elements of the first array light source and a light distribution pattern which is to be formed by the respective semiconductor light emitting elements of the second array light source are offset in the left-right direction of the vehicle lamp.

4. The vehicle lamp according to claim 1, wherein the second array light source is configured to emit light for forming at least a part of a light distribution pattern for high beam.

5. The vehicle lamp according to claim 1, wherein the first array light source is arranged between the first back focal point of the projection lens and the first light source in a front-rear direction of the vehicle lamp.

6. The vehicle lamp according to claim 1, wherein the first light source is configured to emit light for forming a light distribution pattern for low beam, the vehicle lamp further comprising:

a base member, on which the first light source, the first array light source and the second array light source are mounted; and an optical member which is a component separate from the base member and is configured to function as a shade for forming a cutoff line of the light distribution pattern for low beam at a state where the optical member is mounted to the base member.

7. The vehicle lamp according to claim 6, wherein the optical member includes:

a first reflective surface configured to reflect the light emitted from the first array light source towards an incident surface of the projection lens; and a second reflective surface configured to reflect the light emitted from the second array light source towards the incident surface of the projection lens.

8. The vehicle lamp according to claim 6, wherein the base member includes a first surface on which the first light source is arranged and a second surface on which the first array light source and the second array light source are arranged, and wherein the second surface is an inclined surface which is inclined relative to an optical axis of the projection lens such that a light output part of the first array light source arranged on the second surface faces obliquely in a front and upper direction and a light output part of the first array light source is located below the first back focal point.

9. The vehicle lamp according to claim 8, further comprising:

a flexible circuit board, on which the first array light source and the second array light source are arranged, wherein at least a part of the flexible circuit board is fixed to the inclined surface.

10. The vehicle lamp according to claim 8, further comprising:

a rigid circuit board, on which the first array light source and the second array light source are arranged, wherein at least a part of the rigid circuit board is fixed to the inclined surface.

11. The vehicle lamp according to claim 1, wherein a center position of the first array light source is arranged at a position different from a center position of the second array light source in the left-right direction of the vehicle lamp.

12. A vehicle lamp comprising:

a projection lens including an output surface having a convex shape based on only one circular arc;

a first light source arranged at a rear of the projection lens; and a second light source arranged at the rear of the projection lens, wherein the projection lens has a first back focal point and a second back focal point, wherein the first light source is arranged at a position corresponding to the first back focal point, and wherein the second light source is arranged at a position corresponding to the second back focal point.

13. The vehicle lamp according to claim 12, wherein the first light source and the second light source are arranged in an upper-lower direction of the vehicle lamp.

14. The vehicle lamp according to claim 13, wherein the projection lens includes a first lens part configured to form the first back focal point and a second lens part configured to form the second back focal point, wherein the first lens part is formed below the second lens part, wherein the first back focal point is located above the second back focal point, wherein the first light source is configured to emit light towards an incident surface of the first lens part, and wherein the second light source is configured to emit light towards an incident surface of the second lens part.

15. The vehicle lamp according to claim 12, wherein the first light source and the second light source are arranged in a left-right direction of the vehicle lamp.

16. The vehicle lamp according to claim 15, wherein the projection lens includes a first lens part configured to form the first back focal point and a second lens part configured to form the second back focal point, wherein the first lens part is formed at a left side relative to the second lens part, wherein the first back focal point is located at a right side relative to the second back focal point, wherein the first light source is configured to emit light towards an incident surface of the first lens part, and wherein the second light source is configured to emit light towards an incident surface of the second lens part.

17. The vehicle lamp according to claim 12, wherein the projection lens includes a first lens part configured to form the first back focal point and a second lens part configured to form the second back focal point, the vehicle lamp further comprising:

a first reflection part configured to reflect the light emitted from the first light source towards an incident surface of the first lens part; and a second reflection part configured to reflect the light emitted from the second light source towards an incident surface of the second lens part.

18. The vehicle lamp according to claim 12, wherein the first light source is a first array light source including a plurality of semiconductor light emitting elements aligned in at least one row, wherein the second light source is a second array light source including a plurality of semiconductor light emitting elements aligned in at least one row, and wherein a center position of the first array light source is arranged at a position different from a center position of the second array light source in a left-right direction of the vehicle lamp.

19. The vehicle lamp according to claim 18, further comprising:

a base member; and a rigid circuit board, on which the first array light source and the second array light source are mounted, wherein the rigid circuit board is mounted to the base member.

20. The vehicle lamp according to claim 18, further comprising:

a base member, and a flexible circuit board, on which the first array light source and the second array light source are arranged, wherein at least a part of the flexible circuit board is fixed to the base member.

21. The vehicle lamp according to claim 12, wherein the projection lens includes a first lens part configured to form the first back focal point and a second lens part configured to form the second back focal point, and an output surface of the first lens part and an output surface of the second lens part form the convex shape based on the only one circular arc.

22. A vehicle lamp comprising:

a first light source configured to emit light for forming a light distribution pattern for low beam;

a first array light source including a plurality of semiconductor light emitting elements aligned in at least one row extending in a left-right direction of the vehicle lamp; and a second array light source including a plurality of semiconductor light emitting elements aligned in at least one row extending in the left-right direction of the vehicle lamp, wherein the first array light source is configured to emit light for forming at least a part of an additional light distribution pattern for high beam, and wherein the second array light source is configured to emit light for forming an additional light distribution pattern that is to overlap with both the light distribution pattern for low beam and the additional light distribution pattern for high beam on a vertical virtual screen ahead of the lamp.

23. The vehicle lamp according to claim 22, wherein a center position of the first array light source is arranged at a position different from a center position of the second array light source in the left-right direction of the vehicle lamp.

24. The vehicle lamp according to claim 22, further comprising:

a projection lens, wherein the first array light source is arranged at a rear of the projection lens, and wherein respective arrangement pitches of the plurality of semiconductor light emitting elements of the first array light source in the left-right direction of the vehicle lamp are smaller towards a back focal point of the projection lens.

25. The vehicle lamp according to claim 22, wherein the plurality of semiconductor light emitting elements of the first array light source are configured to be individually lit on and off, wherein the plurality of semiconductor light emitting elements of the second array light source is configured to be individually lit on and off, and wherein in light distribution patterns to be projected on a vertical virtual screen ahead of the lamp, a light distribution pattern which is to be formed by the respective semiconductor light emitting elements of the first array light source and a light distribution pattern which is to be formed by the respective semiconductor light emitting elements of the second array light source are offset in the left-right direction of the vehicle lamp.

26. A vehicle lamp comprising:

a projection lens having a plurality of focal points;

a first array light source arranged at a rear of the projection lens and including a plurality of semiconductor light emitting elements aligned in at least one row; and a second array light source arranged at the rear of the projection lens and including a plurality of semiconductor light emitting elements aligned in at least one row, wherein the first array light source and the second array light source are arranged in an upper-lower direction of the vehicle lamp, wherein the plurality of semiconductor light emitting elements of the first array light source are configured to be individually lit on and off, wherein the plurality of semiconductor light emitting elements of the second array light source are configured to be individually lit on and off, and wherein in light distribution patterns to be projected on a vertical virtual screen ahead of the lamp, a light distribution pattern which is to be formed by the respective semiconductor light emitting elements of the first array light source and a light distribution pattern which is to be formed by the respective semiconductor light emitting elements of the second array light source are offset in a left-right direction of the vehicle lamp.

27. The vehicle lamp according to claim 13, wherein the projection lens has a first back focal point and a second back focal point, wherein the first array light source is arranged at a position corresponding to the first back focal point, and wherein the second array light source is arranged at a position corresponding to the second back focal point.

28. The vehicle lamp according to claim 27, wherein the projection lens includes a first lens part configured to form the first back focal point and a second lens part configured to form the second back focal point, the vehicle lamp further comprising:

a first reflection part configured to reflect the light emitted from the first array light source towards an incident surface of the first lens part; and a second reflection part configured to reflect the light emitted from the second array light source towards an incident surface of the second lens part.

29. The vehicle lamp according to claim 28, further comprising:

a base member, on which the first array light source and the second array light source mounted; and an optical member which is a component separate from the base member and is formed with a first opening through which the first array light source is to be exposed ahead of the lamp and a second opening through which the second array light source is to be exposed ahead of the lamp at a state where the optical member is mounted to the base member, wherein the optical member includes the first reflection part and the second reflection part.

30. The vehicle lamp according to claim 27, wherein the projection lens includes a first lens part configured to form the first back focal point and a second lens part configured to form the second back focal point, and wherein a convex portion protruding towards a rear of the lamp is formed at a boundary part between an incident surface of the first lens part and an incident surface of the second lens part.

31. The vehicle lamp according to claim 27, wherein the projection lens includes a first lens part configured to form the first back focal point and a second lens part configured to form the second back focal point, wherein the first lens part is formed below the second lens part, wherein the first array light source is arranged above the second array light source, wherein the first array light source is configured to emit light towards an incident surface of the first lens part, and wherein the second array light source is configured to emit light towards an incident surface of the second lens part.

32. The vehicle lamp according to claim 26, wherein a light output part of each semiconductor light emitting element of the first array light source is configured to face towards a direction different from a light output part of each semiconductor light emitting element of the second array light source in an upper-lower direction of the vehicle lamp.

33. The vehicle lamp according to claim 32, further comprising:

a base member; and a flexible circuit board, on which the first array light source and the second array light source are mounted, wherein a light output surface of each semiconductor light emitting element of the first array light source faces towards a direction different from a light output surface of each semiconductor light emitting element of the second array light source in an upper-lower direction of the vehicle lamp at a state where the flexible circuit board is mounted to the base member.

34. The vehicle lamp according to claim 26, wherein a center position of the first array light source is arranged at a position different from a center position of the second array light source in the left-right direction of the vehicle lamp.

35. The vehicle lamp according to claim 26, further comprising:

a base member; and a rigid circuit board, on which the first array light source and the second array light source mounted, wherein the rigid circuit board is mounted to the base member.

* * * * *